(12) United States Patent
Chrabieh

(10) Patent No.: US 10,539,652 B2
(45) Date of Patent: Jan. 21, 2020

(54) SYSTEM AND METHOD FOR ESTIMATING TIME OF ARRIVAL (TOA)

(71) Applicant: Nestwave SAS, Paris (FR)

(72) Inventor: Rabih Chrabieh, Paris (FR)

(73) Assignee: Nestwave SAS, Paris (FR)

( * ) Notice: Subject to any disclaimer, the term of this patent is extended or adjusted under 35 U.S.C. 154(b) by 0 days.

(21) Appl. No.: 16/027,785

(22) Filed: Jul. 5, 2018

(65) Prior Publication Data

US 2018/0313930 A1    Nov. 1, 2018

Related U.S. Application Data

(63) Continuation of application No. 14/626,734, filed on Feb. 19, 2015, now Pat. No. 10,042,037.

(60) Provisional application No. 61/942,360, filed on Feb. 20, 2014.

(51) Int. Cl.
*G01S 5/06* (2006.01)
*G01S 5/02* (2010.01)
*G01S 11/02* (2010.01)
*H04B 17/336* (2015.01)
*H04L 27/26* (2006.01)

(52) U.S. Cl.
CPC ............. *G01S 5/06* (2013.01); *G01S 5/0215* (2013.01); *G01S 5/0221* (2013.01); *G01S 5/0252* (2013.01); *G01S 11/02* (2013.01); *H04B 17/336* (2015.01); *H04L 27/2628* (2013.01)

(58) Field of Classification Search
CPC .. H04B 1/7117; H04B 1/7113; H04B 17/336; G01S 5/06; G01S 5/0215; G01S 5/0221; G01S 5/0252; G01S 11/02; H04L 27/2628
See application file for complete search history.

(56) References Cited

U.S. PATENT DOCUMENTS

2003/0081659 A1* 5/2003 Yousef ................. H04B 7/005
                                                        375/148
2009/0262010 A1   10/2009 Kwak
(Continued)

OTHER PUBLICATIONS

Sharp et al. "Peak and leading edge detection for time-of-arrival estimation in band-limited positioning systems," IET Comm. vol. 3, No. 10, Jan. 1, 2009, p. 1616. DOI:10.1049/iet-com.2008.0637.
(Continued)

*Primary Examiner* — Sung S Ahn
(74) *Attorney, Agent, or Firm* — Lumen Patent Firm

(57) ABSTRACT

A technique is provided for estimating time of arrival of a signal transmitted as a pulse and received as a sum of pulses. The received signal is filtered with a novel filter that lowers the early side lobes of the received signal to noise level. A first energy rise point is identified at a point of the main lobe of the filtered received signal, at which the energy is higher than the noise by a predetermined level. Starting from the identification of the first energy rise points, the time of arrival is estimated via curve matching, in which the shape of the filtered received signal is matched to the shape of a reference curve composed by a sum of one or more reference curves that are shifted both in time and in energy. The reference curves are found by applying to the transmitted signal the same filter applied to the received signal.

13 Claims, 12 Drawing Sheets

(56) References Cited

U.S. PATENT DOCUMENTS

2011/0286505 A1* 11/2011 Hedley ................ G01S 5/0205
375/224
2013/0094620 A1* 4/2013 Alexander .......... H04J 11/0063
375/343

OTHER PUBLICATIONS

Ducoff et al., "Chapter 8: Pulse Compression Radar," in "Radar Handbook" Jan. 1, 2008, McGraw Hill.
Guvenc et al., "Threshold-based TOA estimation for impulse radio UWB systems," Ultra-wideband, 2005, IEEE Intl. Conf. Sep. 2005, p. 420-425. DOI: 10.1109/ICU.2005.1570024.

* cited by examiner (a) ETU channel (b) EVA channel

SYSTEM AND METHOD FOR ESTIMATING TIME OF ARRIVAL (TOA)

CROSS-REFERENCE TO RELATED APPLICATIONS

This application is a continuation of U.S. patent application Ser. No. 14/626,734 filed Feb. 19, 2015, which claims the benefit of U.S. Provisional Patent Application 61/942,360, both of which are incorporated herein by reference.

FIELD OF THE INVENTION

The present invention, in some embodiments thereof, relates to signal processing, and more particularly, to systems and methods for determining time of arrival (TOA).

BACKGROUND OF THE INVENTION

Time of arrival estimation is the estimation of the travel time of a radio signal from a single transmitter to a remote single receiver. The travel time may be expressed in units of time or in units of distance, as the distance between the transmitter and the receiver can be easily calculated by multiplying the time of arrival times the known speed of the radio wave.

As shown in FIG. 1, a difficulty in the estimation of time of arrival arises from the fact that the radio wave has multiple paths from the transmitter 10 to the receiver 12. The first path 14 is the direct path from the transmitter to the receiver, and is the path that TOA estimation seeks to identify. However, the shape of a waveform generated by the receiver 12 in response to the reception of the radio signal is a combined waveform which includes noise, and a sum of the first arriving waveform (corresponding to the first path 14) with a multitude of waveforms corresponding to other paths (for examples, 16, 18, and 20) which are received by the receiver 12 at later times. Each path is filtered to a desired bandwidth as the reference waveform does not exist outside this bandwidth.

As seen in FIG. 2, the bandwidth filtering causes each waveform to have early side lobes and late side lobes. The early side lobes interfere with waveforms corresponding to preceding (shorter) paths and the late side lobes interfere with waveforms corresponding to subsequent (longer) paths (echoes or multipath). In FIG. 2, the radio wave pulse (tap) 22 which has travelled via the first path 14 and has arrived at a time $\tau_0$ has a first waveform 24 generated by the bandwidth filtering. The first waveform 24 has early side lobes 26 and late side lobes 28. Similarly, the second waveform 30 generated after bandwidth filtering the second received radio wave pulse 32 (which as travelled the second path 16) has second early lobes 34 and second late lobes 36.

Commonly the impulse response of bandwidth filter to each pulse has a sinc or similar low-pass waveform in the time domain, as seen by the shapes of the waveforms in FIG. 2. The combined waveform that is received by the receiver, therefore has a shape which includes a main lobe sided by early and late lobes. Two combined waveforms obtained by bandwidth filtering output responses of two antennas radio signals are shown in FIGS. 3 and 4. The waveforms 40 and 42 are generated by bandwidth filtering the radio wave (a plurality of pulses) as received by two respective antennas. The waveforms 40 and 42 are very different from the waveform 44 corresponding to the reference waveforms (which is the filtered transmitted waveform, i.e. the multipath waveform that is transmitted by the transmitter and filtered by the prior art filter). It is therefore very difficult to use simple signal processing to find the exact time of arrival by comparing the reference waveform 34 to the filtered waveforms.

Some techniques for extracting the time of arrival from such waveforms are known. However, such techniques are either simple to process and inaccurate or, like the Maximum Likelihood (ML) algorithm, accurate but very processing intensive, and therefore expensive.

BRIEF SUMMARY OF EMBODIMENTS OF THE INVENTION

The impulse response shape is usually a sinc, a raised cosine, or some relatively slowly decaying waveform symmetrical around the origin. The reason for the symmetry is that the frequency domain matched filter creates a zero phase signal symmetrical in time domain. The matched filter is necessary to optimize symbol detection in noisy environment (used in conjunction with an equalizer). In this problem, the information is carried by all the taps.

However, the inventor has found that for estimating the TOA where the information is carried by the first tap only, and whose phase has no relevance in this case, the matched filter is not necessarily the right strategy. Some embodiments of the present invention, therefore, relate to the use of a near-causal filter (near zero energy before the origin) which ensures that the first tap is not interfered (or less interfered) by subsequent taps. Filtering a signal in this manner makes it easier to identify the first tap, and therefore to calculate the TOA.

Therefore an aspect of some embodiments of the present invention relates to a method for estimating a time of arrival of a signal, the signal being generated by a transmitting device as a transmitted pulse and received by a receiving device as a received signal, the received signal being filtered via a near-causal filter, to generate a first waveform indicative of a filtered received signal. A shape of an impulse response of the near causal filter has a main lobe having a maximal power within the shape, early side lobes located before the main lobe, and late side lobes located after the main lobe. the early side lobes have peaks proximal to a noise level of the first waveform. A ratio of the maximal power of the main lobe to a second maximal power of a tallest of the early side lobes within a desired distance from the main lobe is at least 13 dB. The slope of the main lobe is near the slope of the main lobe of the sinc filter's impulse response. A width of the main lobe is larger than a width of a main lobe of a sinc filter's impulse response, while being maintained near the width of the sinc filter's main lobe. The method comprises: (i) if the first waveform is in a frequency domain, moving first waveform to a time domain; (ii) estimating a noise level in early samples before a start of the first waveform in the time domain; (iii) identifying a first energy rise point on the first waveform in the time domain, in which an energy rises above a predetermined threshold relative to the estimated noise level; (iv) from first energy rise point, following a rising curve of a main lobe of the first waveform in the time domain; and (v) identifying a location of a first pulse within the first waveform in the time domain, according to a predefined decision technique.

In a variant, a frequency response of the filter is near flat.

In another variant, moving first waveform to a time domain comprises applying an inverse fast Fourier transform (iFFT) to the first waveform.

In yet another variant, the predetermined threshold is about 10 dB over the estimated noise.

In a further variant, following a rising curve of the main lobe of the first waveform in the time domain comprises oversampling the first waveform.

Optionally, oversampling is performed via inverse DFT (Discrete Fourier Transform), via CZT (Chirp-Z Transform), or via iFFT.

In yet a further variant, the method further comprises, between steps (iii) and (iv): determining a property comprising at least one of: a signal to noise ratio (SNR) of the first waveform in the time domain, a channel length, and a power delay profile; selecting one of a plurality of predetermined near-causal filters matching the property, the predetermined near-causal filters being pre-calculated for enabling better estimation of the time of arrival when applied to signals having corresponding properties; applying the selected near-causal filter to the received signal.

In some embodiments of the present invention, the predefined decision technique comprises: selecting a first point at or above the first energy rise point on the first waveform and calculating SNR in a vicinity of the first point; using a look-up table to match the SNR to a predetermined time offset between the first point and a waveform of a first pulse to be received.

Optionally, the predetermined time offset is determined via at least one of: one or more theoretical considerations, one or more simulations, previously acquired experimental data.

In a variant, the predefined decision technique comprises: applying the near causal filter to the transmitted signal to generate a reference waveform; choosing at least two consecutive points on the first waveform above a predetermined energy level with respect to the estimated noise; calculating a matching between a shape of a segment between the at least two consecutive points and a shape of the reference waveform; determining one or more points along the first waveform until an operating point is found at which a match between the first waveform and the reference waveform is found; constructing an instance of the reference waveform from a segment in a vicinity of the operating point; determining a time interval between the operating point and a center of the constructed instance of the reference waveform, the time interval being an estimate of the time of arrival.

Optionally, the operating point is one of: a point at which a minimal least squares error between a shape of the first waveform and a shape of a corresponding section of the reference waveform is found; a point at which a least squares error between the shape of the first waveform and a shape of a corresponding section of the reference waveform is below a first predetermined threshold and an energy of the point is above a second pre-determined threshold with respect to the estimated noise; a point at which a minimal weighted least squares error between a shape of the first waveform and a shape of a corresponding section of the reference waveform is found, the minimal weighted least squares error being expressed as $$\min_{a,t_1}(Y' - a_1 X'(t_1))^H C^{-1}(Y' - a_1 X'(t_1))$$

$$Y' = a_1 X_1' + N'$$

where Y' and X'($t_1$) are the complex vectors containing the 2 or N consecutive points, respectively taken from the first waveform and from the reference waveform, $a_1$ is a complex scalar and $t_1$ is a time shift of the reference waveform, X'$_1$ is a complex vector corresponding to a waveform of first pulse to be received, C is the noise covariance matrix of the 2 or N point noise vector N' from the general model of signal plus noise and N' is the noise left after subtracting a waveform of the first arriving pulse (first path) from Y'; a point at which a weighted least squares error is below a predetermined error between the shape of the first waveform and a shape of a corresponding section of the reference waveform and an energy of the point is above a second pre-determined threshold with respect to the estimated noise.

In another variant, the predefined decision technique comprises: applying the near causal filter to the transmitted signal to generate a reference waveform; choosing at least two consecutive points on the first waveform above a predetermined energy level with respect to the estimated noise; calculating a least squares error $|Y'-\Sigma a_i X'(t_i)|^2$ between a shape of a first waveform and shapes of a sum at least two of instances of the reference waveform, the minimization formula being, where Y' and X'($t_i$) are the complex vectors containing the 2 or N consecutive points, respectively taken from the first waveform and from the $i^{th}$ instance of reference waveform, $a_i$ is a complex scalar, $t_i$ is a time shift of the $i^{th}$ instance of the reference waveform and i≥2; determining one or more points along the first waveform until an operating point is found at which the least square error is minimized or at which the least square error is below a certain threshold; constructing i instances of the reference waveform from a segment in a vicinity of the operating point; determining a time interval between the operating point and a center of the first constructed instance of the reference waveform, the time interval being an estimate of the time of arrival.

Optionally, the operating point at which the weighted least squares error is minimized or below a predefined threshold, the weighted least squares error being: $(Y'-\Sigma a_i X'(t_i))^H C^{-1}(Y'-\Sigma a_i X'(t_i))$ where C is the noise covariance matrix of the 2 or N point noise vector N' from the general model of signal plus noise $Y'=\Sigma a_i X'_i + N'$, and N' is the noise left after subtracting i waveforms corresponding to first i arriving paths whose impact on the first path are to be taken into account wish to take into account (i≥2 and includes the first path).

In yet another variant, the method further comprises, before step (i): applying the near-causal filter to the received signal in time domain, in conjunction to a low pass filter.

Optionally, the method further comprises, following the application of the near causal filter, at least one of: down-sampling, pilot descrambling, accumulation, and integration of the first waveform.

In a further variant, the method comprises, prior to step (i): converting the received signal into a frequency domain signal; descrambling the frequency domain signal; applying the causal to the frequency domain signal filter in the frequency domain to generate a first waveform in the frequency domain; and converting the first waveform in the frequency domain filtered into the first waveform in the time domain.

In yet a further variant, the method comprising, prior to step (i): at least one of down-sampling, pilot descrambling, accumulation, and integration of the received signal in the time domain to generate a correlated received waveform; converting the correlated received waveform into a frequency domain signal; applying the causal to the correlated received waveform in the frequency domain to generate a first waveform in the frequency domain; and converting the first waveform in the frequency domain filtered into the first waveform in the time domain.

In some embodiments of the present invention, the method comprises constructing the near causal filter prior to applying the near causal filter.

In a variant, the constructing of the near causal filter comprises: defining the filter in the frequency domain as by K-dimensional vector X, and in the time domain as a N-dimensional vector x, where X=Fx, F being a Fourier transform matrix having size K by N in which $F_{k,n}=e^{-2j\pi kn}/\sqrt{N}$; defining a matrix A as A=W+V, in which V is a frequency domain diagonal matrix having elements $V_{k,k}$, while w is a time domain diagonal matrix in which a strong weight $w_{n,n}$ is selected in a non-causal region and elsewhere $w_{n,n}$ is relaxed, and W is a Toeplitz of w; choosing values for the $V_{k,k}$ and $w_{n,n}$; defining G is a vector representative of the filter's ideal frequency domain response, where $G_k=1$ for k≤K and $G_k=0$ otherwise; defining $\underline{G}$ as a diagonal matrix in which diagonal $G_{k,k}$ elements correspond to $G_k$ elements of the vector G; defining P is an arbitrary frequency domain phase rotation diagonal matrix; defining $\overline{P}$ as a vector formed by diagonal elements $P*_{k,k}$ of a matrix $P^H$; solving $\overline{P}$ for $max_p \overline{P^H}(\underline{G}VA^{-1}V\underline{G})P$; determining X by using $X=A^{-1}VG\overline{P}$; determining x by using X=Fx; if necessary, tweaking $V_{k,k}$ and $w_{n,n}$ in order to obtain satisfactory vectors X and x.

Optionally, the non-causal region is a region of the early sidelobes of the and $w_{n,n}\gg 1$ in the causal region elsewhere $w_{n,n}$ is relaxed; or the causal region is determined by a length of the channel (PDP), the non-causal region length is set to be equal to or a little longer than a length of the channel and is defined with varying weight level $w_{n,n}$, and $w_{n,n}$ is relaxed in the causal region.

In a variant, the constructing of the near causal filter comprises: defining the filter in the frequency domain as a K-dimensional vector X, and in the time domain as a N-dimensional vector x, where $x=F^H X$, and F is a Fourier transform matrix having size K by N, in which $F_{k,n}=e^{-2j\pi kn}/\sqrt{N}$; selecting |X| to be a desired amplitude response in the frequency domain, calculating X by using $X=|X|e^{-1H\{log\ |X|\}}$, where H is the Hilbert transform; calculating x by using $x=F^H X$; and if necessary, tweaking |X| in order to obtain satisfactory vectors X and x.

Another aspects of some embodiments of the present invention relates to a system for estimating a time of arrival of a signal generated by a transmitting device as a transmitted pulse, the system comprising: (a) a receiving device, configured for receiving the transmitted pulse and generating a received signal in response to the transmitted device; (h) a processing unit, configured for processing the received signal by: (i) applying a near-causal filter to the received signal in order to generate a first waveform, the near causal filter having an impulse response waveform wherein: a shape of an impulse response of the near causal filter has a main lobe having a maximal power within the shape, early side lobes located before the main lobe, and late side lobes located after the main lob; the early side lobes have peaks proximal to a noise level of the first waveform; a ratio of the maximal power of the main lobe to a second maximal power of a tallest of the early side lobes within a desired distance from the main lobe is at least 13 dB; the slope of the main lobe is near the slope of the main lobe of the sinc filter's impulse response; a width of the main lobe is larger than a width of a main lobe of a sinc filter's impulse response, while being maintained near the width of the sinc filter's main lobe; (ii) if the first waveform is in a frequency domain, moving first waveform to a time domain; (iii) estimating a noise level in early samples before a start of the first waveform in the time domain; (iv) identifying a first energy rise point on the first waveform in the time domain, in which an energy rises above a predetermined threshold relative to the estimated noise level; (v) from first energy rise point, following a rising curve of a main lobe of the first waveform in the time domain; and (vi) identifying a location corresponding a first received pulse within the first waveform in the time domain according to at least one predefined decision technique, and determining a time coordinate of the identified location to calculate the time of arrival; (vii) calculating the time of arrival data by using the time coordinate of the identified location and outputting the time of arrival; (c) a memory unit in communication with the processing unit and configured for storing data indicative of: the non-causal filter, computer-readable instructions for processing the received signal, computer-readable instructions for processing the received signal and for executing the at least one predefined decision technique.

In a variant, the memory unit is configured for storing data indicative of a plurality of adaptations of the near causal filter, each adaptation corresponding to a respective received signal having at least one respective property related at least one of a signal to noise ratio (SNR) of the received signal in the time domain, a channel length, and a power delay profile, and being configured for filtering the respective received signal in order to increase an accuracy of the estimation of the time of arrival after the received signal is filtered. Prior to applying the near causal filter, the processing unit is configured for extracting a value of the at least property of the received signal, and selecting an adaptation corresponding to the extracted value.

In another variant, the processing unit is configured for identifying a location corresponding to a first received pulse by: selecting a first point at or above the first energy rise point on the first waveform and calculating SNR in a vicinity of the first point; using a look-up table to match the SNR to a predetermined time offset between the first point and a waveform of a first pulse to be received, the offset being the time coordinate. The memory unit is configured for storing the look-up table, the look-up table comprising one or more lists corresponding to a respective one or more filters, each list having a sublist of SNR values and a corresponding sublist of time offset values, each time offset value corresponding to a respective SNR value.

In yet another variant, the processing unit is configured for identifying a location corresponding to a first received pulse by: applying the near causal filter to the transmitted signal to generate a reference waveform; choosing at least two consecutive points on the first waveform above a predetermined energy level with respect to the estimated noise; calculating a matching between a shape of a segment between the at least two consecutive points and a shape of the reference waveform; determining one or more points along the first waveform until an operating point is found at which a match between the first waveform and the reference waveform is found, wherein the operating point is the identified location. The processing unit is configured for calculating the time of arrival data by: constructing an instance of the reference waveform from a segment in a vicinity of the operating point; and determining a time interval between the operating point and a center of the constructed instance of the reference waveform, the time interval being an estimate of the time of arrival. The memory unit is configured for storing data indicative of the transmitted signal.

Optionally the operating point is one of: a point at which a minimal least squares error between a shape of the first waveform and a shape of a corresponding section of the reference waveform is found; a point at which a least squares error between the shape of the first waveform and a shape of a corresponding section of the reference waveform is below a first predetermined threshold and an energy of the point is above a second pre-determined threshold with respect to the estimated noise; a point at which a minimal weighted least squares error between a shape of the first waveform and a shape of a corresponding section of the reference waveform is found, the minimal weighted least squares error being expressed as $$\min_{a,t_1}(Y' - a_1 X'(t_1))^H C^{-1}(Y' - a_1 X'(t_1))$$

$$Y' = a_1 X'_1 + N'$$

where Y' and X'($t_1$) are the complex vectors containing the 2 or N consecutive points, respectively taken from the first waveform and from the reference waveform, $a_1$ is a complex scalar and $t_1$ is a time shift of the reference waveform, X'$_1$ is a complex vector corresponding to a waveform of first pulse to be received, C is the noise covariance matrix of the 2 or N point noise vector N' from the general model of signal plus noise and N' is the noise left after subtracting a waveform of the first arriving pulse (first path) from Y'; a point at which a weighted least squares error is below a predetermined error between the shape of the first waveform and a shape of a corresponding section of the reference waveform and an energy of the point is above a second pre-determined threshold with respect to the estimated noise.

In a further variant, the processing unit is configured for identifying a location corresponding to a first received pulse by: applying the near causal filter to the transmitted signal to generate a reference waveform; choosing at least two consecutive points on the first waveform above a predetermined energy level with respect to the estimated noise; calculating a least squares error |Y'-$\Sigma a_i X'(t_i)$|$^2$ between a shape of a first waveform and shapes of a sum at least two of instances of the reference waveform, the minimization formula being, where Y' and X'($t_i$) are the complex vectors containing the 2 or N consecutive points, respectively taken from the first waveform and from the i$^{th}$ instance of reference waveform, $a_i$ is a complex scalar, $t_i$ is a time shift of the i$^{th}$ instance of the reference waveform and i≥2; determining one or more points along the first waveform until an operating point is found at which the least square error is minimized or at which the least square error is below a certain threshold, the operating point being the identified location. the processing unit is configured for calculating the time of arrival data by: constructing i instances of the reference waveform from a segment in a vicinity of the operating point; determining a time interval between the operating point and a center of the first constructed instance of the reference waveform, the time interval being an estimate of the time of arrival. The memory unit is configured for storing data indicative of the transmitted signal.

Optionally, the operating point at which the weighted least squares error is minimized or below a predefined threshold, the weighted least squares error being: (Y'-$\Sigma a_i X'(t_i)$)$^H$C$^{-1}$(Y'-$\Sigma a_i X'(t_i)$) where C is the noise covariance matrix of the 2 or N point noise vector N' from the general model of signal plus noise Y'=$\Sigma a_i X'$+N', and N' is the noise left after subtracting i waveforms corresponding to first i arriving paths whose impact on the first path are to be taken into account wish to take into account (i≥2 and includes the first path).

In yet a further variant, the memory unit is configured for storing data indicative of a plurality of second adaptations of the near causal filter, each second adaptation corresponding to a respective first waveform having at least one respective property related at least one of a signal to noise ratio (SNR) of the first waveform in the time domain, a channel length of the first waveform in the time domain, and a power delay profile of the first waveform in the time domain, and being configured for filtering the received signal in order to increase an accuracy of the estimation of the time of arrival after the received signal is filtered; following the applying of the near causal filter. The processing unit is configured for: analyzing the first waveform and extracting therefrom at least one value of the at least one waveform property, and selecting a second adaptation corresponding to the extracted value, if available; and applying the second adaptation to the received signal, to generate a new first waveform to replace the previously generated first waveform.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale. In particular, the dB scale on many impulse response drawings should be assumed as a relative scale without particular meaning in an absolute manner. SNR (signal-to-noise ratio) values are relative and are therefore properly represented by the scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 5:
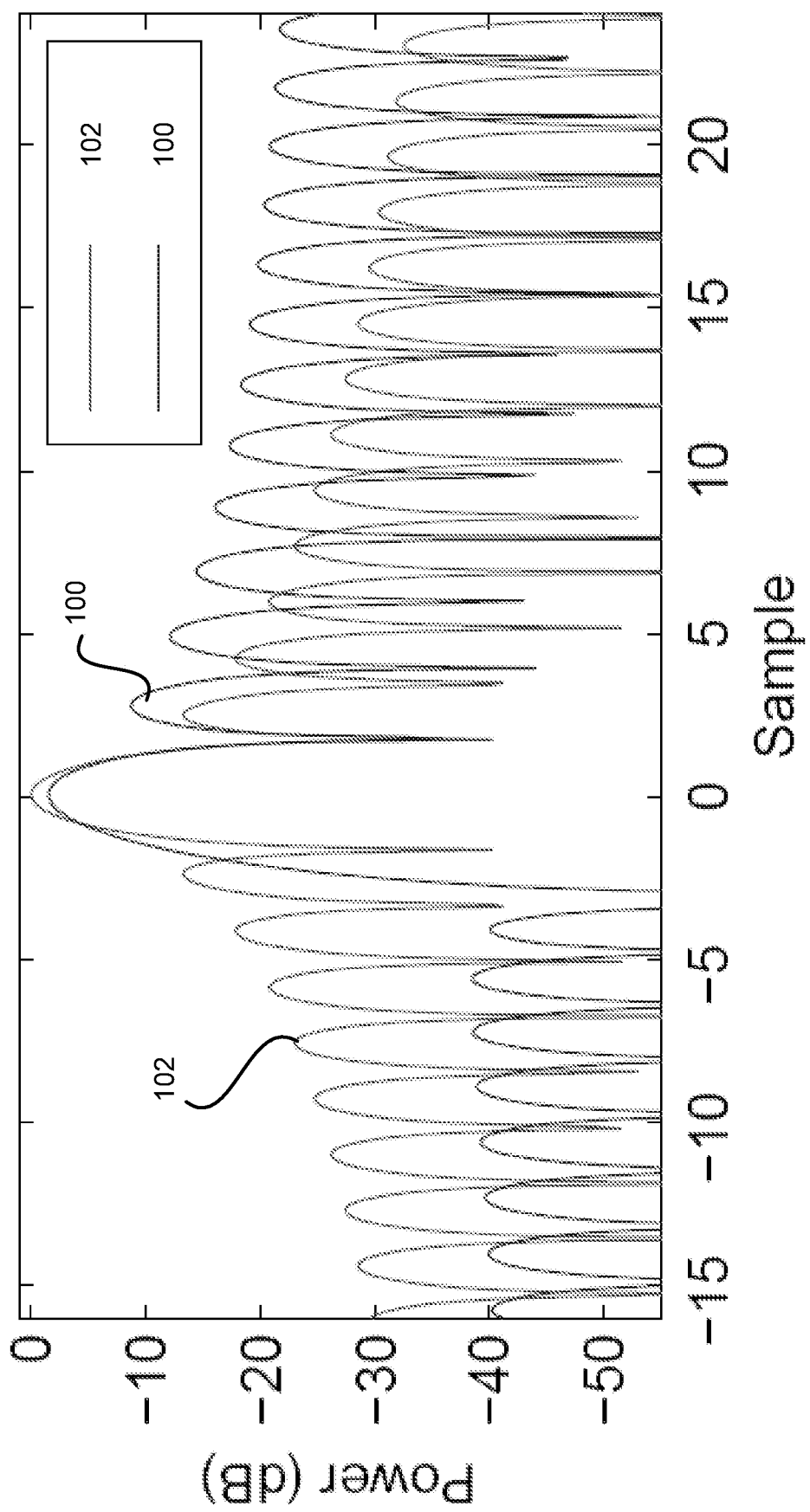
FIG. 5 is a graph in which a first waveform represents an impulse response of a near-causal filter of the present invention and a second waveform represents a an impulse response of a sinc filter known in the art.
Figure 6:
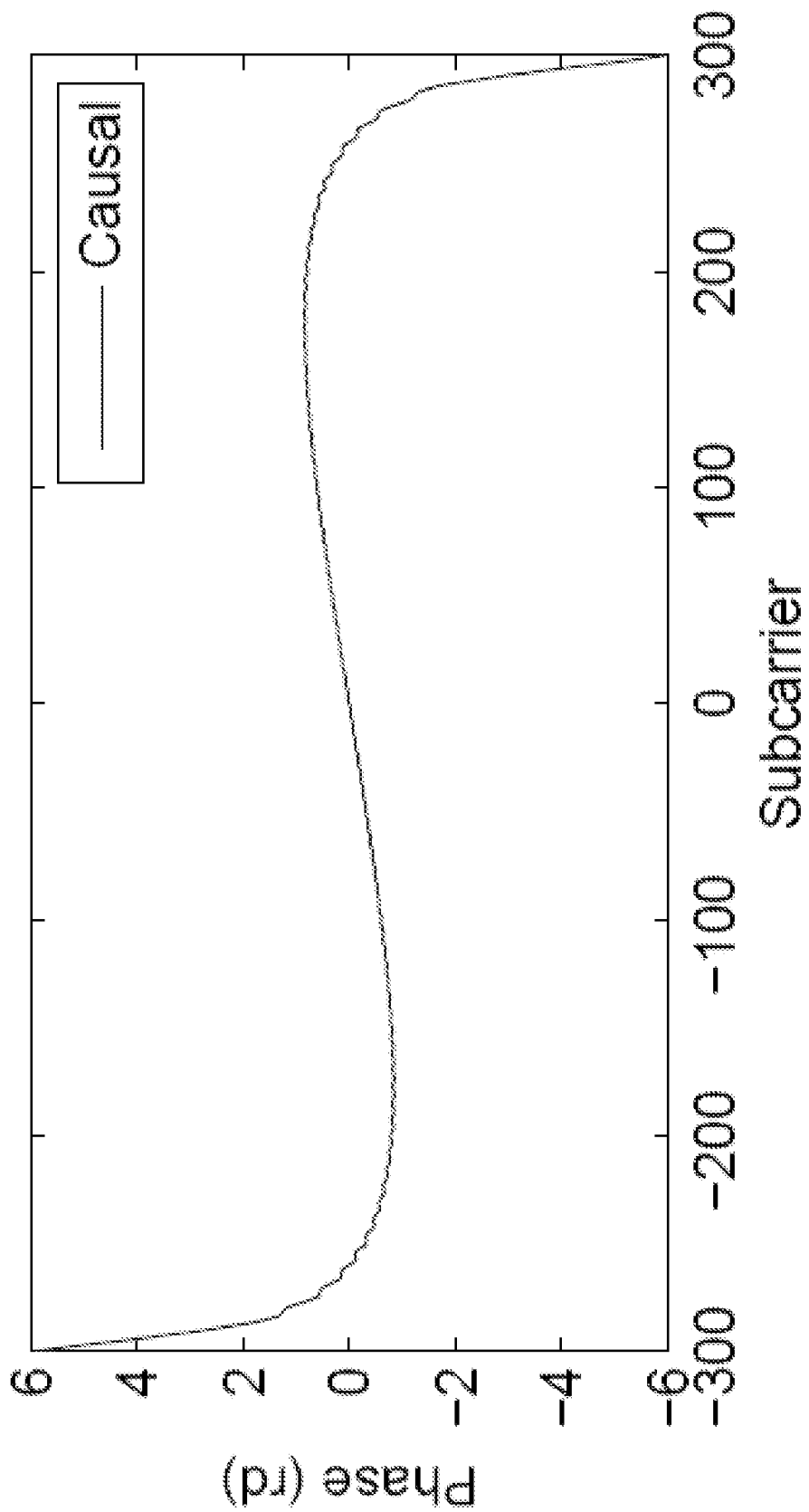
FIGS. 6 and 7 are phase vs frequency and power vs frequency representations of the impulse response of the near-causal filter of the present invention
Figure 7:
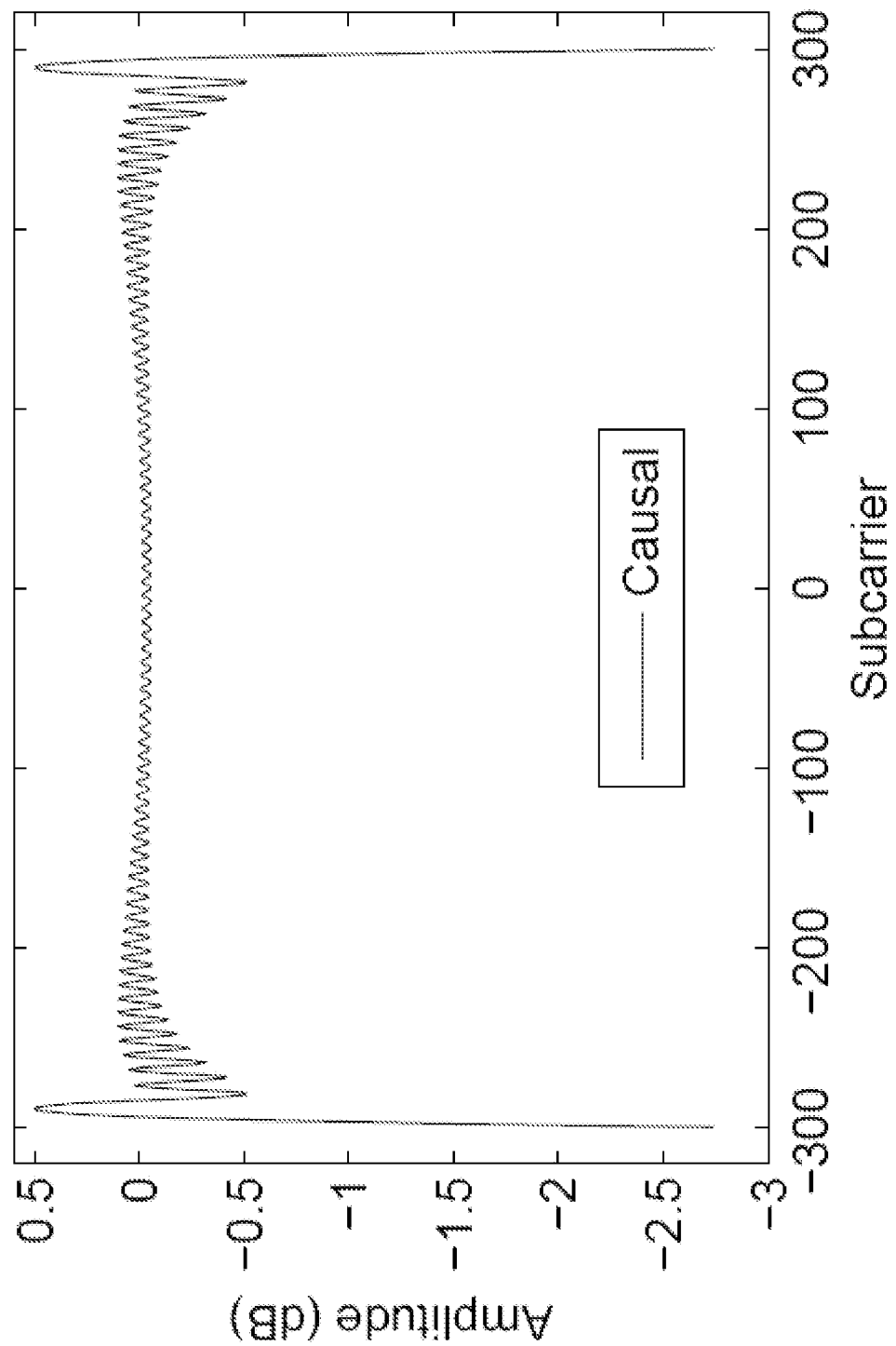

Referring now to FIGS. 5-7, FIG. 5 is a graph in which a first waveform 100 represents a reference signal filtered by a filter of the present invention and a second 102 waveform represents a reference signal filtered by a sinc filter known in the art. The graph of FIG. 5 is a time domain graph expressed as power vs. distance. FIG. 6 is a frequency domain waveform corresponding to the waveform 100, and is expressed as phase vs. frequency. FIG. 7 is a frequency domain waveform corresponding to the waveform 100 and is expressed as power vs. frequency.

Given an input signal (received signal or received waveform) generated by an antenna in response to the antenna's receipt of a radio signal composed of a plurality of taps, the input signal is filtered via a filter of the present invention, to generate a filtered waveform. The filter used for filtering the input signal is a causal or near causal filter, wherein the shape of the filter's impulse response in time domain has the following characteristics:

(i) a main lobe having a maximal power within the shape, early side lobes located before the main lobe, and late side lobes located after the main lobe;

(ii) the early side lobes have peaks proximal to a noise level of the input signal;

(iii) a ratio of the maximal power of the main lobe to a second maximal power of a tallest of the early side lobes within a desired distance from the main lobe is at least 13 dB;

(iv) the slope of the main lobe is near the slope of the main lobe of the sinc filter's impulse response;

(v) a width between the main lobe's beginning and the main lobe's peak is larger than a corresponding width of a sinc filter's impulse response between the sinc filter' main lobe's beginning and the sinc filter's main lobe's peak, while being maintained near the corresponding width in the sinc filter's impulse response; for example, the above mentioned width of the impulse response of the filter of the present invention may be larger than the corresponding main lobe of a sinc filter' impulse response by no more than 42%; and (vi) a ratio of the maximal power of the main lobe to a third maximal power of the tallest of the late lobes at a location at which aliasing occurs (due to down-sampling in frequency domain) is at least −30 dB;

(vii) optionally, the frequency response of the filter of the present invention is near flat.

By comparing the waveforms 100 and 102, it can be seen that each of the early lobes in the first waveform 100 obtained by a filter of the present invention are significantly smaller (less energetic) than the early lobes of the second waveform 102. The slope from the latest of the early lobes to the center of the central lobe in the first waveform 100 is near the slope of the main lobe of the second waveform 102. It will be shown later in the document, that the steep rise is an important element that facilitates identification of the time of arrival.

Before preceding to the next section, it should be noted that in this document, vectors denoted by capital letters indicate vectors in the frequency domain, while vectors denoted by small letters indicate vectors in the time domain. However, at times, for simpler notation, the same formulas may be used interchangeably in frequency and time domain, and the same notation may be used in both domains. In any case, frequency and time domain are simply a change of basis with respect to each other.

Diagonal matrices in one domain transform into Toeplitz matrices in the other domain. And the element-wise product · is a convolution in the other domain.

I. Construction of the Filter

It should be noted that while the filter of the present invention can be obtained in a plurality of different methods, the scope of the present invention encompasses the actual filter and the effect that the filter has on an input signal generated by an antenna in response to a plurality of radio wave pulses. The following sections A to D describe methods for constructing the filter. These methods are merely examples and do not limit the scope of the present invention.

A. Constraints or Weights Method

Denote the Fourier transform matrix by F of size K×N where K is the dimension of the frequency space and N is the dimension of the time space, and with element $F_{k,n} = e^{-2j\pi kn}/\sqrt{N}$ (assuming K≤N, and rows k>K are removed after re-ordering). n and k are respectively the time and frequency indices. Vectors and matrices in time domain are written in small letters, and the corresponding frequency domain quantities in capital letters. The filter's impulse response in time and frequency domain is $$X = Fx$$

(and $x = F^H X$, valid only if K=N). The filter's desired frequency domain response is a vector G. In a variant, G is the transmitted waveform. In another variant, $G_k = 1$ for k≤K and $G_k = 0$ otherwise. For TOA estimation, the kind of filter impulse response we are interested in, $G_k$ is real (zero phase), or if it has a phase, the phase is of no importance.

One solution to creating near-causal filters is to set time and frequency constraints on the filter's impulse response such as $$|x_n|^2 < e_n |X_k|^2 - |G_k|^2 < \epsilon_k$$

where $e_n$ and $\epsilon_k$ are respectively time and frequency domain error functions. For example, in the time domain's non-causal region $e_n \ll 1$, otherwise $e_n$ is relaxed. $\epsilon_k \ll 1$ for all k.

The frequency domain constraints implies that a phase error is unimportant. Additional or alternative weighted least squares constraints are given by $$x^H w x < e'(PX-G)^H V(PX-G) < \epsilon'$$

where w and V are respectively time and frequency domain diagonal weight matrices carefully chosen to achieve a desired impulse response shape. In a first non limiting example, in the time domain's non-causal region a strong weight $w_{n,n} \gg 1$ is chosen, and elsewhere $w_{n,n}$ is relaxed. In another non-limiting example, the non-causal region length (or the length of the early side lobes region) is determined by the length of the channel (PDP). The non-causal region length is equal to or a little higher than the channel length to guarantee that no interference is incurred from subsequent multipath. The non-causal region length can be defined with varying weight level $w_{n,n}$, to take into account that late multipath tend to be weaker. The length of the early side lobes region could be extended to allow for a region with noise only (no multipath and weak side lobes). In that extended region, noise can be estimated relatively precisely. $V_{k,k}$ is approximately constant for all k. P is an arbitrary frequency domain phase rotation diagonal matrix to be determined for best results. P can also apply some amplitude correction. The parameters e' and t' are small values relative to the values of the elements in matrices w and V, respectively. The parameters e' and $\epsilon'$ are tweaked, manually or automatically in some optimization loop to achieve desired impulse response shape, or desired Time of Arrival estimation performance (such as desired cumulative distribution function of the estimation error, obtained for a given channel model).

There are solutions to the constrained quadratic optimization. But a simpler and quicker solution can be obtained by the following unconstrained least squares minimization where weights w and V and phase rotation (with amplitude correction) P are tweaked until a solution is found as follows:

$$\min_{x,P} x^H w x + (PX-G)^H V(PX-G). \quad (1)$$

We can convert the time domain $x^H w x$ quantity to frequency domain $X^H W X$ where W is non-diagonal Toeplitz. Thus equation (1) can be written as $$\min_{X,P} X^H (W+V) X - 2\Re X^H P^H V G. \quad (2)$$

Let A=W+V, $\underline{G}$ the matrix formed by the (real) vector of G, and $\overline{P}$ the vector formed by the diagonal $P^*_{k,k}$ of matrix $P^H$. Note that $P^H$ and V are diagonal matrices. Thus equation (2) can be written as $$\min_{X,P} X^H A X - 2\Re X^H V \underline{G} \overline{P}. \quad (3)$$

$\Re X^H P^H V G$ is the real part of the complex scalar $X^H P^H V G$. By solving solve the quadratic form (3) with respect to X, the following is obtained:

$$X = A^{-1} V \underline{G} \overline{P}. \quad (4)$$

By replacing solution (4) into equation (3), what is obtained is $$\max_{\overline{P}} \overline{P}^H \underline{G} V A^{-1} V \underline{G} \overline{P} \rightarrow \quad (5)$$

$$\max_{\overline{P}} \overline{P}^H B \overline{P}$$

where matrix $B = \underline{G} V A^{-1} V \underline{G}$ is known. The solution for $\overline{P}$ is the strongest Eigen-vector (SEV), Finally, X is obtained from equation (4) and $x = F^H X$. If the solution is unsatisfactory, the weights w and V are tweaked as desired and the process is re-iterated.

Figure 1:
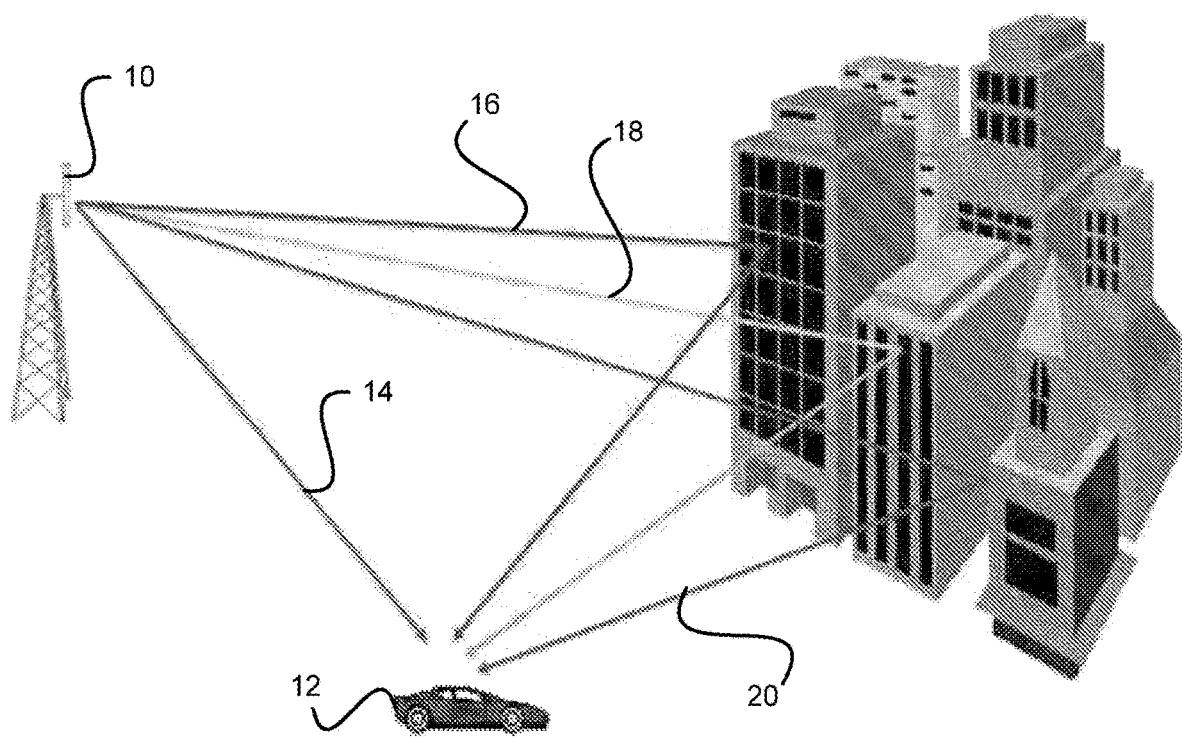
FIG. 1 is a schematic drawings illustrating different paths taken by a radio wave traveling from an antenna to a receiver.
Figure 2:
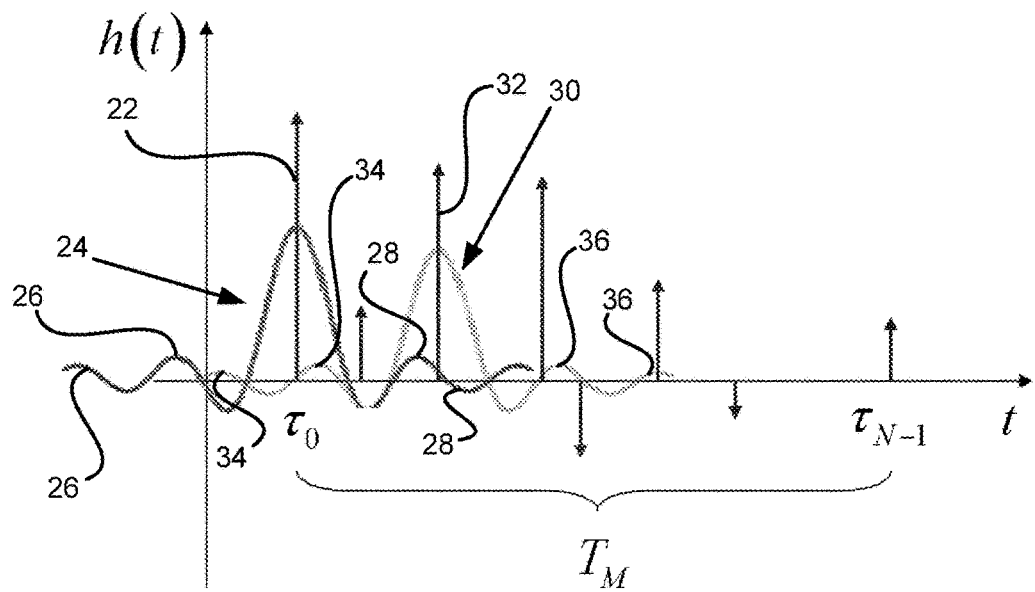
FIG. 2 is a graph showing the impulse responses of a plurality of single pulses (taps), the impulse responses being obtained by bandwidth filtering each pulse via a sinc filter known in the prior art.
Figure 3:
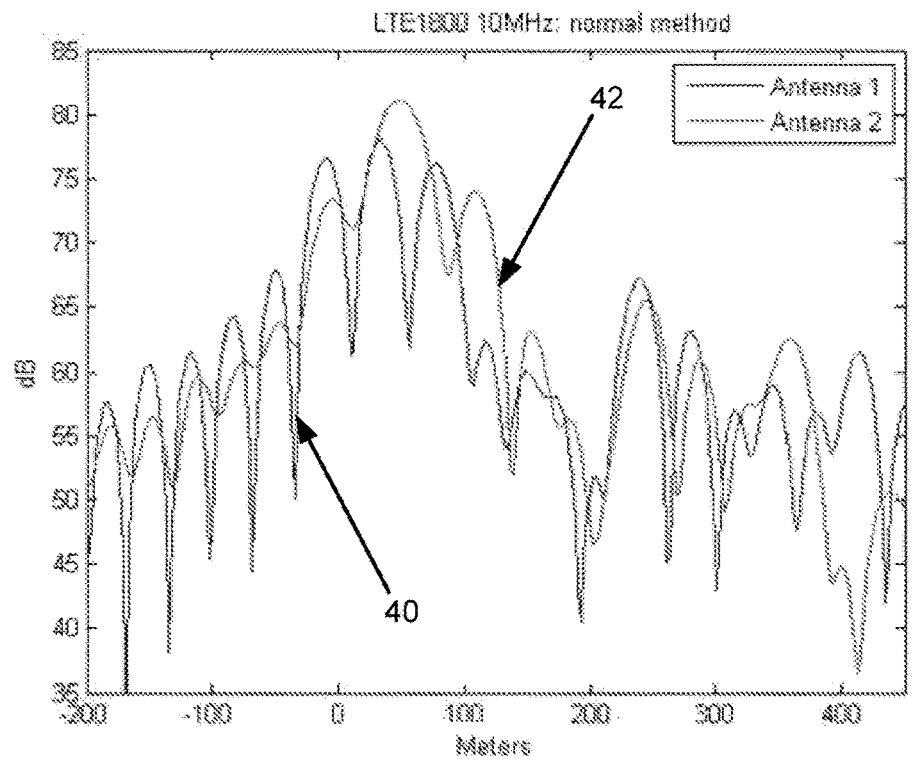
FIG. 3 is a graph illustrating pulse shapes indicative of a plurality of taps as experimentally received by two antennas, the data being obtained by bandwidth filtering the output of the antennas via a sinc filter known in the prior art.
Figure 4:
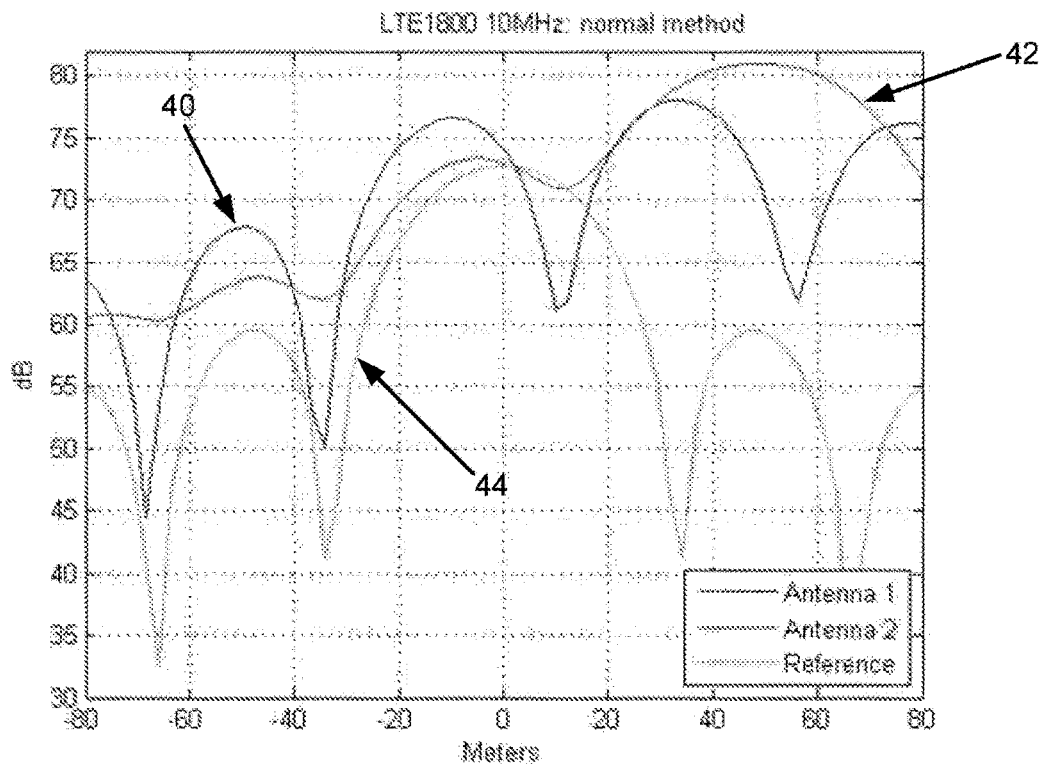
FIG. 4 is a graph in which a section of the graph of FIG. 3 is shown and enlarged, and in which a reference pulse shape is added.

Optionally, the elements (modulus) of $\overline{P}$ can be collapsed to a constant value, such as 1, to suppress the oscillations of the power vs frequency graph of FIG. 3, so as to convert the graph of FIG. 3 to a square waveform In a variant, after collapsing the modulus of $\overline{P}$, an additional phase search is performed for a refined value near the collapsed modulus, e.g. via gradient descent or any other optimization method to find a local maximum or minimum (depending on which formula we use).

Defining the weight matrices may be tricky due to algorithm convergence issues (especially when there are several equal eigenvalues resulting in multiple solutions). In some cases, the inventors have observed that the time domain weight should not be symmetrical to achieve convergence. The examples in FIGS. 5-7 were generated for a Long-Term Evolution (LTE) 10 MHz signal (K=601 subcarriers, N=1024 samples) with weights given in the Table I, case of high signal-to-noise ratio (SNR). Using the same method, a near-causal filter generated for low SNR is given in Table II.

TABLE I

| Time domain | $w_{n,n}$ | Frequency domain | $V_{k,k}$ |
|---|---|---|---|
| n = 0 | 0.001 | 0 ≤ k < K | 1 |
| 1 ≤ n ≤ 140 | 0.002 | K ≤ k < N | 0 |
| 141 ≤ n < N | 1 | | |

TABLE II

| Time domain | $w_{n,n}$ | Frequency domain | $V_{k,k}$ |
|---|---|---|---|
| 0 ≤ n ≤ 1 | 0.1 | 0 ≤ k < K | 1 |
| 2 ≤ n ≤ 141 | 0.2 | K ≤ k < N | 0 |
| 142 ≤ n < N | 1 | | |

B. Minimum Phase Filter Design with Hilbert Transform

Starting from a desired amplitude response in frequency domain |X|, the phase of the corresponding minimum phase filter can be obtained via the Hilbert transform $\mathcal{H}$, $$\arg\{X\} = -\mathcal{H}\{\log |X|\}$$

and hence the impulse response in frequency and time domain can be obtained, $$X = |X| e^{-j\mathcal{H}\{\log |X|\}} \quad x = F^H X$$

There are many possibilities to choose |X| from. It should be 0 in the stopband where we have no information (the transmitter normally does not transmit any information outside the allowed band). But in the passband, it can be flat, it can oscillate a bit, or it can monotonically decrease or increase. It can be a raised cosine, trapezoidal, a Hamming window, etc. Each possibility results in a different time domain impulse response with advantages and disadvantages. Thus, a suitable filter can be chosen for different input signals, depending on the features of the signals. The tradeoffs between using a filter of the present invention as opposed to using a matched filter known in the art are:

(a) The main lobe's peak in the filter of the present invention has a generally lower energy with respect to a matched filter known in the art (typically a zero-phase sinc filter). If the loss is significant, the ability to discriminate the main lobe from earlier lobes and noise (low to medium SNR) is decreased. Thus, a filter of the present invention should be constructed to ensure that the loss in the main peak's power does not reduce the ability to differentiate the main lobe from the early side lobes.

(b) The main lobe's width in the filter of the present invention is generally wider than the main lobe of a matched filter known in the art. The wider the main lobe, the shallower the rise to the main lobe's peak. If the main lobe is too wide, it can be hard to discriminate the main lobe from overlapping multipath. Thus, a filter of the present invention should be constructed to ensure that the main lobe's width power does not reduce the ability to differentiate the main lobe from the overlapping multipath.

(c) The early lobes are rejected/decreased. This is called causal rejection. However, causal rejection has a lesser effect on the main lobe, decreasing the power at the main lobe's peak. On the one hand, weak causal rejection results in confusion with early lobes and noise, with little effect on the main lobe's peak. On the other hand, strong causal rejection, clearly greatly reduces the power of the early lobes, enabling a clear estimate of noise, but also lowers the power of the main lobe's peak.

The minimum phase filter design method is quite simple to implement in computerized signal processing and the Hilbert transform is fast to calculate; but finding the best |X| may be difficult. In a variant, |X| can be chosen as a shortened versions of a sinc filter. Hence, a unique parameter defines the filters, which is the length of the sinc filter after it has been truncated in the time domain. For this class of filters, the inventors have observed that the longer the sinc filter, the less oscillations in the frequency domain, the more the causal rejection, but the weaker and wider the main lobe. The tradeoff depends on average SNR or SNR of first cluster of paths. Given the speed of the solution and its potential dependence on a unique parameter, it is well fit to be used in an automatic parameter optimization loop.

In another variant, the minimum phase filter design method may be used in combination with the constraints or weights method described above. One method supplies an initial impulse response for the other method, for example, and iterations between the two methods may be performed to arrive to a suitable solution. One method could also fix the amplitude or phase response for the other method, with iterations between the two.

C. Maximizing SNR with Multipath Treated Like Colored Noise in Time Domain

In the frequency domain, the transmitted waveform, before multipath and noise, is denoted by vector G. The noise covariance matrix V is an identity matrix if the noise is white (non-colored). The impulse response of a conventional matched filter (MF) $X_{MF}$, maximizes $$SNR = \frac{X_{MF}^H GG^H X_{MF}}{X_{MF}^H V X_{MF}}$$

and the solution is $X_{MF} = V^{-1} G$.

The conventional matched filter treats all multipaths equally. It is well suited for maximizing the energy captured by all of the multipath, for example, for data decoding. But it is not best suited for extracting the first path (or some path) from the rest of the multipath.

Thus, the filter of the present invention, which is aimed at simplifying the identification of the first path, is designed such that all the paths except the first path are considered colored noise, or colored interference in time domain. Note that multipaths are normally statistically independent. In fact, the multipaths appear like normal noise, often Gaussian, convolved with the transmitted waveform G, which can often be all ones in the frequency domain's passband. I.e. there is often no distinction between normal noise and multipaths except for their power levels. The model for the construction of the filter of the present invention is essentially that the noise plus interference power levels in time domain suddenly increase after the first path arrives.

The noise coloring can now be represented by $$V + \sum_{i>1} w_i P_i GG^H P_i^H$$

where $w_i$ is the expected power level of path i (excluding the first path in this summation), $P_i$ the diagonal phase ramp in frequency domain, or time shift in time domain, to shift path i by its time offset $t_i$. By oversampling the time domain, limiting the multipath positions to oversampled time offsets, and setting $w_i$ to zero where we don't expect any multipath, the noise plus multipath colored covariance matrix can be simplified to $$V + \Gamma W \Gamma^H$$

Where, in frequency domain, $\Gamma$ is the diagonal matrix of vector G. and W is Fourier transform of the diagonal matrix of time domain weights (or power levels) $w_i$. W is Toeplitz and can be efficiently computed via one fast Fourier transform (FFT) followed by index shifts per row.

The filter of the present invention X is now given by maximizing $$SNR = \frac{X^H GG^H X}{X^H(V+\Gamma W \Gamma^H)X}$$

and the solution is $X=(V+\Gamma W \Gamma^H)^{-1} G$.

After defining the expected Power Delay Profile (PDP) of the channel (i.e. the multipath profile), X can be easily designed. The time domain impulse response x the waveform 100 in FIG. 5 and X typically has a shape such as the waveforms of FIGS. 6 and 7. Multiplying X by the transmitted waveform G, the reference waveform is obtained at the receiver side. I.e., it is the waveform received in the absence of noise and multipath.

It can be shown that the effective SNR on each point of the reference waveform (for the first path) is a function of noise and multipath, and is maximized at the best operating point, which is a point typically before the peak of the reference waveform, if there is a nearby second path. The best operating point is a tradeoff between being as high as possible above noise, but as early as possible to be far from subsequent multipath. While conventional Matched Filter maximizes SNR in the absence of multipath, it fails to maximize SNR in their presence. The filter of the present invention is able to maximize SNR in the presence of multipath. This is clearly seen in FIGS. 16 and 17.

Figure 16:
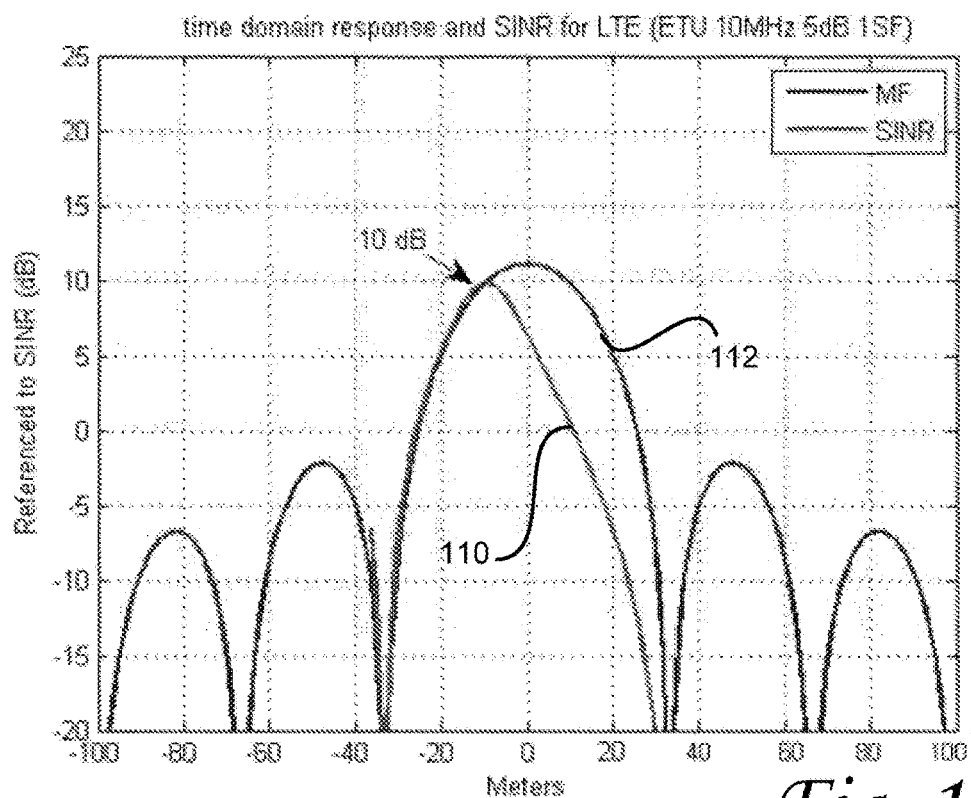
FIGS. 16 and 17 are experimentally obtained power vs distance graphs illustrating measured SNR of the first path over noise plus remaining multipath for a received signal filtered by a prior art sinc filter and a near-causal filter of the present invention.
Figure 17:
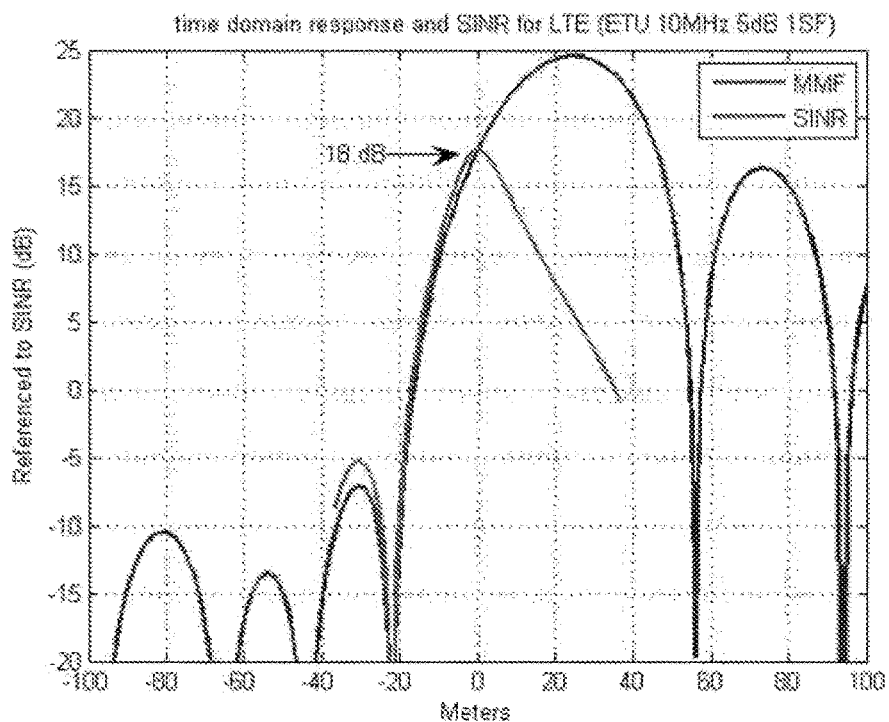

In both FIGS. 16 and 17, a cellular type channel ETU (Extended Typical Urban) with 10 MHz bandwidth and an input SNR of 5 dB is considered. The transmission system is 4G (LTE) with 1 subframe of pilots. In FIG. 16, the curve 110 illustrates the measured SNR (sometimes denoted as SINR) of the first path over noise plus remaining multipath for a received signal filtered by a prior art sinc filter (the filtered received signal is illustrated by curve 112). In FIG. 17, the curve 114 is the measured SNR (sometimes denoted as SINR) of the first path over noise plus remaining multipath for the same received signal filtered via the filter of the present invention, which has been determined by maximizing SNR. The curve 116 represents the filtered received signal. It can be seen that in the filter of the present invention, the best operating point (the identification of which will be discussed later) is 8 dB stronger if the received signal is filtered via the filter of the present invention.

D. M-Path-Matched Filter

Instead of isolating the first path alone, as was done in section C above, the filter can be constructed by isolating a number M of pre-selected paths. The problem is identical to the previous section, except for the fact that the M pre-selected paths are removed from the denominator, while all the remaining undesired paths are retained.

This is useful, for example, when performing near-ML (near-Maximum Likelihood) by considering M=2 paths to match the waveform while defining the remaining paths as noise. If the filter's impulse response X constructed considering the first path alone differs from the filter's impulse response X constructed considering the first M paths (for joint near-ML matching), the matching between the first M reference waveforms and the input signal may be improved. When M=2, the best operating point (maximum SNR) is relaxed by not being too constrained by the proximity of the second path. The second path will be jointly estimated with the first path and is not assumed as colored noise.

With respect to conventional very high complexity ML estimation, where many paths interfere with the first path and have to be accounted for, the M-Path-Matched Filter method provided in this patent application significantly reduces the number of paths interfering with the first path (to 0, 1 or a few), and allows robust near-ML estimation by considering very few multipaths for joint estimation.

A second use of the M-Path-Matched Filter is the Last Path-Matched Filter, which enables better detection of the last path, for example for channel length estimation.

Another use could be to isolate the different paths one after the other, iteratively estimating the paths (and their respective positions), starting from the first path, for example, subtracting it, and then moving onto the second path and so on. This can be useful if need or desire arises to determine the position of arrival of some or all the paths. The paths can be found iteratively; using a First-Path Matched Filter, or M-Path-Matched filter, the first or M paths are detected, then subtracted from the filtered received signal Then the next path or the next M' paths are found, until all paths are detected and accounted for.

After describing the above four methods for constructing a filter, it should be noted that using causal filtering does not preclude from using, in a hybrid manner, other techniques such as super-resolution techniques or ML. Super resolution techniques can encompass MUSIC, root MUSIC, Non-Gaussianness methods (such as independent component analysis (ICA)), etc.

Figure 8:
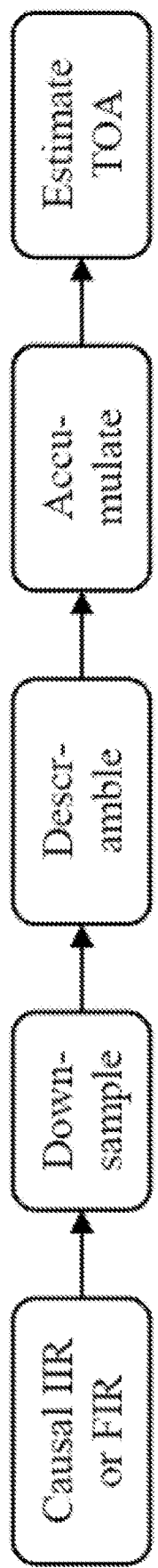
FIGS. 8-10 are three flowcharts illustrating different method for implementing the filter of the present invention in time domain systems, such as GPS (global positioning system).
Figure 9:
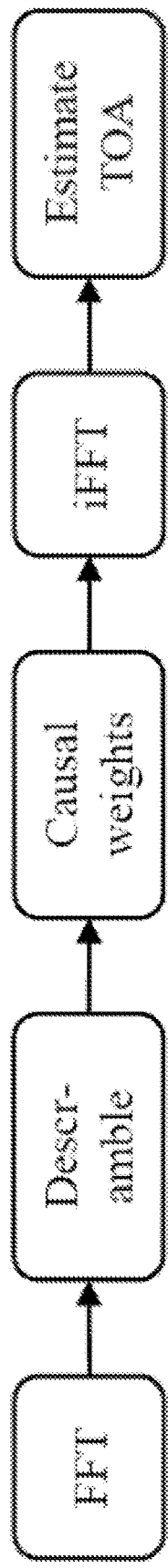
Figure 10:
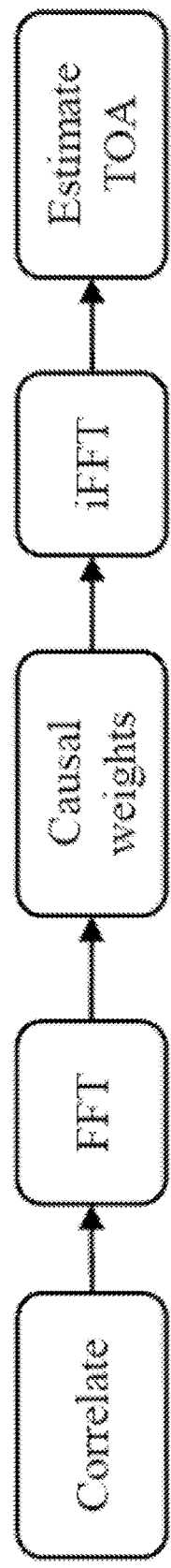

Referring now to FIGS. 8-10, three flowcharts illustrate different method for implementing the filter of the present invention in time domain systems, such as GPS (global positioning system). In FIG. 8, a first method is illustrated for time domain systems, e.g. in CDMA (code division multiple access) or GPS systems. Causal filtering is applied first to the received signal in time domain, usually at the same time as low-pass filtering is applied to remove out of band noise and interference. The causal filtering operation is thus merged with the low pass filtering operation. The causal filter can be applied in the form of an FIR or IIR filter that approximates the desired causal filter. This operation is followed by optional down-sampling, by pilot descrambling, by optional chip accumulation or integration, before reaching the final step for estimating TOA. At that stage, the impulse response looks causal and facilitates detection of first path from subsequent paths.

In FIG. 9, we provide the equivalent method for frequency domain systems such as OFDMA (Orthogonal frequency-division multiple access). An FFT or different operator is often used in these systems to convert the input signal into a frequency domain signal and so the causal filtering can be easily applied in frequency domain by multiplying with causal weights. After application of the causal filter, an inverse FFT (iFFT) is applied to the filtered signal to convert it to time domain and estimating TOA.

In FIG. 10, another method is provided for time domain systems such as CDMA or GPS. The first stage of correlation incorporates the usual low pass filtering, descrambling and accumulation. At that point, causal filtering can be applied in the frequency domain via FFT, causal weights and then iFFT. The difference between FIG. 8 and FIG. 10 is the time at which the causal filtering is applied: in the first case, the causal filtering is applied early on within the low pass filtering, while in the second case, the causal filtering is applies later after descrambling and accumulation, via FFT/iFFT.

In FIG. 8, the causal filter may include a very long finite impulse response (FIR) filter or an infinite impulse response (IIR) filter in the time domain that creates a pseudo-causal impulse response. Using a FIR is usually unacceptable in mobile phones, because the causal filter is typically too long and necessitates too many multipliers per output sample.

The IIR may be of minimum phase type filter or a filter that matches as closely as possible the desired response designed in sections A and B above. The IIR could be designed to match closely that response by tweaking its coefficients, or for example, by minimizing the error between the IIR and desired response, $\min_{B,A}|B-AX|^2$ where the IIR in Z transform is given by $X(z)=B(z)/A(z)$, and the desired response is on the unit circle (frequency domain). For example, Matlab's invfreqz function may be used for such IIR design.

FIGS. 9 an 10 illustrate methods in which fast Fourier transform (FFT) and inverse fast Fourier transform (iFFT) are used. In FIG. 9, descrambling can be performed after FFT. In FIG. 10 is made prior to FFT can benefit from scrambling sequences (+/−1) in time domain, and from existing implementations. Using Chirp-Z Transform (CZT) instead of iFFT allows oversampling at low complexity in a region of interest if the approximate location of the peak is known.

II. Estimating the TOA

Following the construction of the filter, and the filter's application on the input signal, processing of the filtered signal is required in order to estimate the time of arrival.

Figure 11:
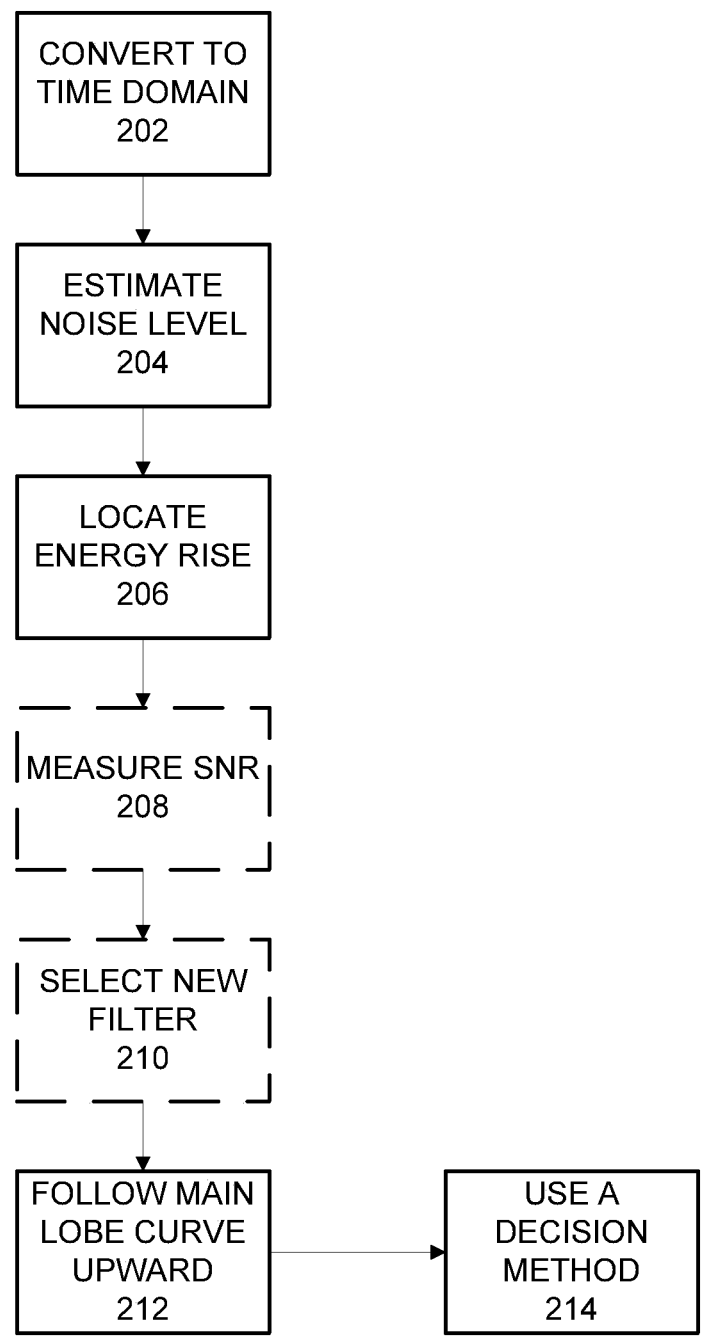
FIG. 11 is a flowchart illustrating a method for estimating TOA, according to some embodiments of the present invention.

FIG. 11 is a flowchart 200 illustrating a method for estimating time of arrival of a received (input) signal filtered via the filter of the present invention.

At 202, if the filtered waveform is in the frequency domain, the filtered waveform is moved into the time domain where the first path can be more naturally observed. Optionally, an iFFT is performed on the filtered waveform to move the waveform into time domain.

The resulting impulse response in time domain contains the new reference waveform (transmitted waveform filtered by filter of the present invention), plus its echoes and noise. The first path is less impacted by subsequent multipath since the early side lobes of subsequent multipath are attenuated by the filter of the present invention. The goal now is to determine the time of arrival based on this new time domain impulse response.

At 204, the noise level is estimated in the early samples before the (causal) signal starts (i.e. before the first path). Noise might contain some aliased signal, which can now be considered as noise. Noise power (or variance) estimation can be performed by averaging the power (or an approximation of the power) of a few samples in a region determined to be free of useful signal (prior to first path arrival). It could alternatively be performed by measuring the peak power levels of a few peak in that region, and then mapping those peak values to some level value compatible with a noise power level.

At 206, the first energy/power and rise is then located. In a variant, the first energy rise is identified in the first sample that is above a threshold relative to noise (e.g. 10 to 12 dB above noise). The first energy rise can alternatively be a set of neighboring samples above threshold, for improved detection of the energy rise (e.g. a few neighboring samples 7 to 9 dB above noise). Optionally, such samples should not carry correlated noise, i.e. they should not usually be the nearest neighbors.

Optionally at 208, the SNR is more accurately measured. In a variant, the channel length or channel statistics (Power Delay Profile (PDP)) may be more accurately measured as well. SNR is measured as the accumulation of the power (or approximate power) of a few samples known to contain useful signal over the pre-estimated noise power. Samples are known to contain useful signal if they occur after the first path, and are some level above noise power. The new SNR might be calculated as a local SNR in the region (samples) immediately following the energy rise instead of the overall SNR, which is impacted by far-away and non-interfering clusters of paths. Based on this information, a better suited filter from a plurality of predetermined filters of the present invention may be selected at 210, to replace the previously selected filter, and applied to the received signal. The plurality of predetermined filters are pre-calculated to match different types of channel models and/or SNR levels, to enable better/easier estimation of the TOA when such signals are received. The selection of the filter according to the signal's properties is explained in detail in Section III of this document.

From the first energy rise point, the rising curve of the main lobe is followed upwards at 212 by computing more samples (higher oversampling), for example via inverse DFT (Discrete Fourier Transform), via CZT (Circular Z Transform), or via usual inverse FFT.

As the rising curve of the main lobe is followed, the identification of the first pulse (and thus the estimation of the time of arrival) is at 214 performed via any of the following decision methods.

A. One-Point Decision in Time Domain

From a selected point on the rising curve that is sufficiently above noise (e.g., the first energy rise point or a point a little higher than the first energy rise point), and based on approximate SNR levels of the filtered receives signal in the time domain (preferably at the selected point), the time offset to the first path is predicted via a pre-determined look up table. The look up table may be generated via simulation, and/or theoretical considerations, and/or via averages of measured offsets from the operating point to the center of the reference signal (this last method will be explained in detail in section B below). Given an SNR level and a detected signal value sufficiently above noise (to reduce noise), and sufficiently early (to reduce interference from subsequent multipath), the average time offset from such a point to the true first peak (i.e. to the first path arrival) can be determined by simulation or theoretically. The SNR, noise level, and signal values of the received filtered signal are easily measured. Based on these measurement, the corresponding time offset is found on the look-up table. An interpolation can be performed between two look up table entries to fine tune the level and hence the time offset. This method is robust and able to detect weak first paths (in Non-Line-of-Sight (NLOS) condition).

B. 2-Point or N-Point Matching Decision in Time Domain

Rather than just 1 point, 2 or N consecutive points (or segments) are used on the received curve to match against the reference waveform X'.

$$X'=\Gamma X=\Psi G=X\cdot G,$$

where transmitted waveform G has been filtered by X to obtain X'; $\Gamma$ is the diagonal matrix of G, and $\Psi$ is the diagonal matrix of X. Likewise, the received signal Y is filtered by X to obtain Y'=$\Psi$Y=X·Y.

The curve matching (or fitting) in this section is performed in time domain over a few consecutive samples.

The matching may be done according to any known shape matching technique. In a non-limiting example, the matching is done by minimizing the least squares (LS) formula:

$$\min_{a,t_2} |Y' - a_1 X'(t_1)|^2$$

where Y' and X'($t_1$) are the complex vectors containing the 2 or N consecutive points, respectively taken from the filtered received waveform and from the reference waveform. $a_1$ is a complex scalar and $t_1$ is a time shift of the reference waveform; both parameters are to be determined such that we minimize the least squares (LS) criterion. As the curve's climb is followed, the residual error of the LS formula should normally decrease. In some embodiments of the present invention, the following of the curve's climb is stopped when a predetermined minimum high level above noise is reached with an error that is below a predetermined threshold. The thresholds depend on one or more characteristics of the signal and noise level, and may be pre-computed and matched to the signal's measured characteristics via a look-up table or computed online according to measurements of such signal characteristic(s). In some embodiments of the present invention, the following of the curve's climb is stopped when the residual error starts increasing, which can signal that the point that is being analyzed is beyond the peak or that there are nearby multipath whose impact is commencing to be felt. The point at which the following of the curve is stopped (called the operating point), corresponds to some known time shift $t_1$ of the reference curve. This time shift is an estimate of the position of the first path. This method can lead to more accurate results if the subsequent paths are not too nearby.

It should be noted that if a threshold for the LS error is used, the threshold may be determined via simulation or theoretical consideration as a level below which there is a desired probability that the correct match has been achieved. Depending on the case and on the user's requirements, the user may select the desired probability and use the selected probability to find the corresponding threshold via simulation or theoretical consideration.

Figure 12:
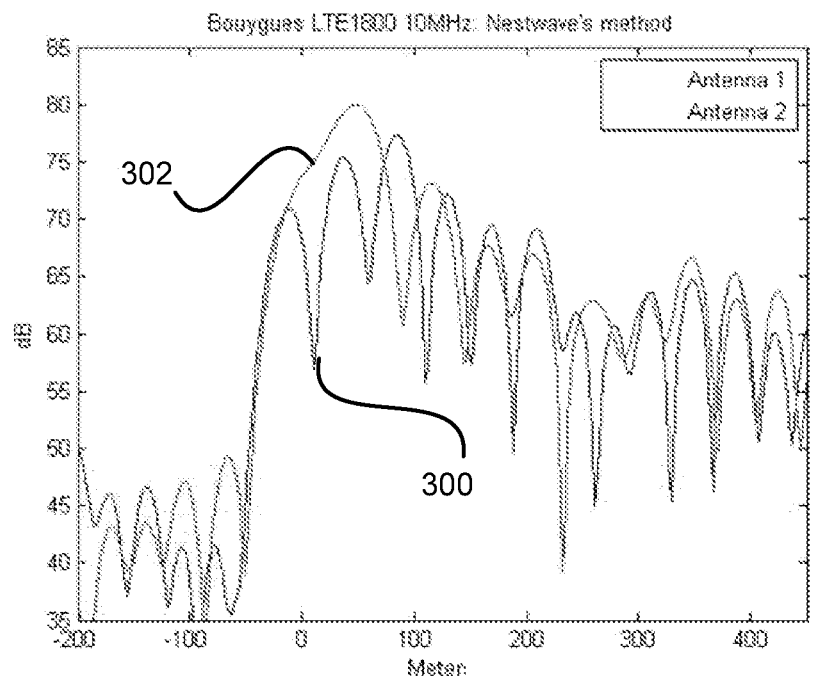
FIGS. 12 and 13 are experimentally obtained power vs distance graphs illustrating the 2-point or N-point decision method for estimating TOA, according to some embodiments of the present invention.
Figure 13:
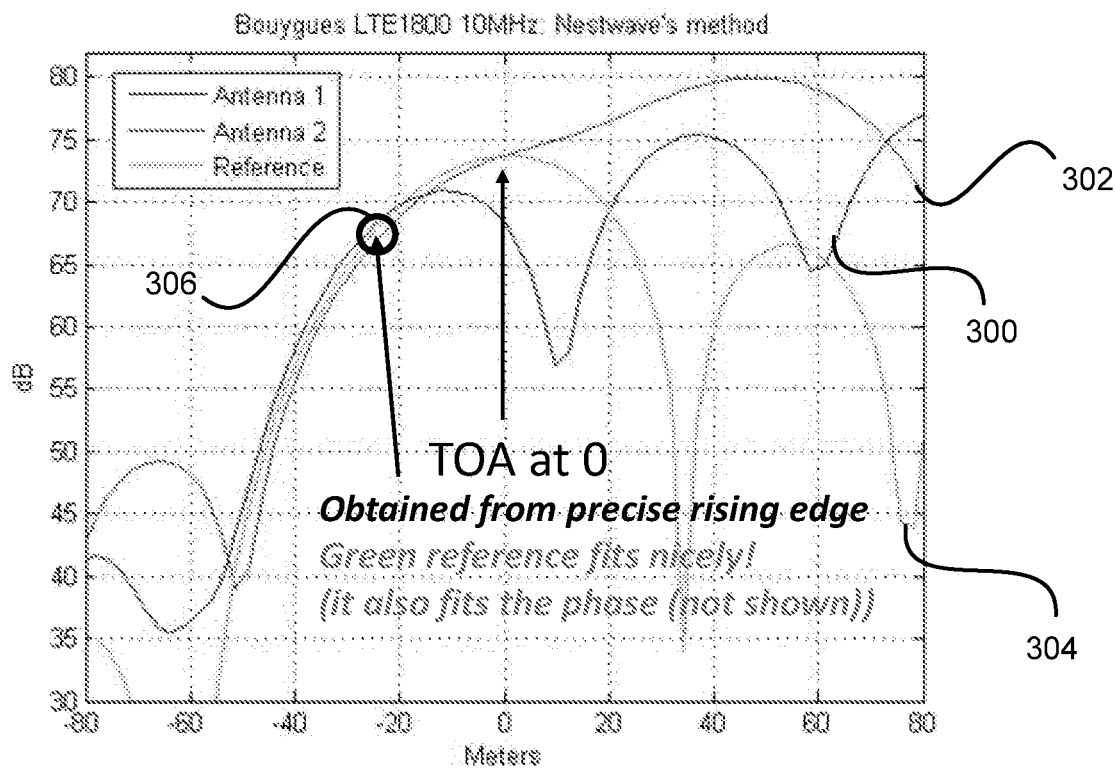

FIGS. 12 and 13 are experimentally obtained power vs distance graphs illustrating the 2-point or N-point decision method. FIG. 13 is a detail of FIG. 12 with the addition of the reference waveform.

In FIG. 12, the first waveform 300 and the second waveform 302 are waveforms of two received signals filtered via a filter of the present invention. Each received signal was output by the same receiving antenna as a response to two transmitted signals emitted by respective transmitting antennas. The transmitting antennas are located at the same location. The receiving antenna was at a high floor, where the first tap (pulse) was significantly stronger than the following taps.

In FIG. 13, the received filtered waveforms 300 and 302 are compared to the reference waveform 304. It can be seen that the rise of the main lobes in both waveforms 300 and 302 closely match the rise of the main lobe from the reference signal. By following the rise of each waveform 300 and 302 and minimizing the residual LS error between each waveform 300 and 302 and the reference waveform 304, the operating point 306 of the waveforms 300 and 302 is found. The shape of the received filtered waveforms in the region of the operating point (or operating segment) allows the construction of the full reference waveform; and hence its time of arrival at the center (of the green waveform). It should be noted that even though the waveforms 302 and 304 are different, their operating point or operating segment is approximately the same, since they originate from to the same location with respect to the receiving antenna.

C. Near-ML Decision

If the second path is nearby leading to noisy $\min_{a,t_1} |Y' - a_1 X'(t_1)|^2$ measurements, then a 2-paths LS criterion (near-Maximum Likelihood (ML)) is applied as follows:

$$\min_{a,t_1,t_2} |Y' - a_1 X'(t_1) - a_2 X'(t_2)|^2$$

by subtracting from the received signal both the first and second paths, located at hypothesized positions $t_1$ and $t_2$ respectively. The search areas for $t_1$ and $t_2$ are small (given that the time corresponding to the first path is approximately known), hence this method is not computationally intensive. The impact of the third path is likely to be small onto the rising edge of the first path. Hence, a near-ML estimate is achieved by considering the first and second paths only.

Optionally, the 3rd or more paths can be accounted for as above, i.e.

$$\min_{a,t_i} |Y' - \Sigma a_i X'(t_i)|^2$$

$t_1$ provides an estimate of the TOA of the first path. If the residual error after LS matching with M paths is small (below a certain threshold, as explained above), the point at which the residual error is below a certain threshold is considered to be the operating point, and there is no need to try M+1 paths. In some experimental cases analyzed by the examiners, the threshold has been found to be −20 dB. However, this value may change according to properties of the noise and signal.

It should be noted that even with M paths, the near-ML decision is always less computationally intensive than prior art ML, where many more path have to be taken into account due to their non-causal interference with the first path via their early side lobes.

Figure 14:
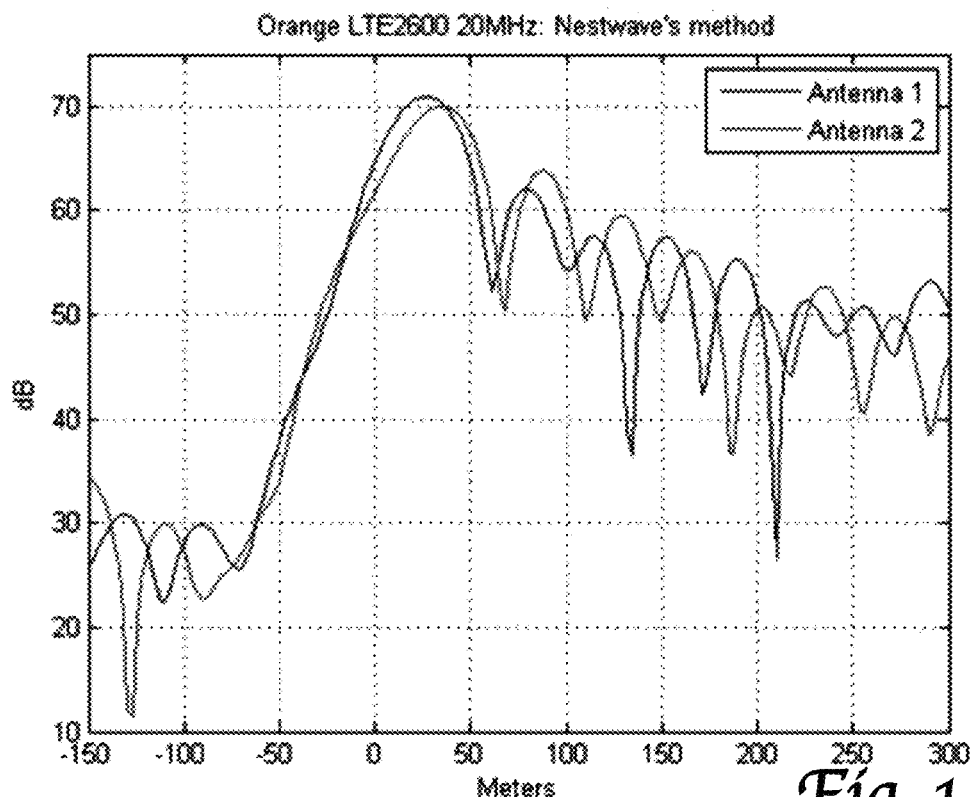
FIGS. 14 and 15 are experimentally obtained power vs distance graphs illustrating the near ML decision method, according to some embodiments of the present invention.
Figure 15:
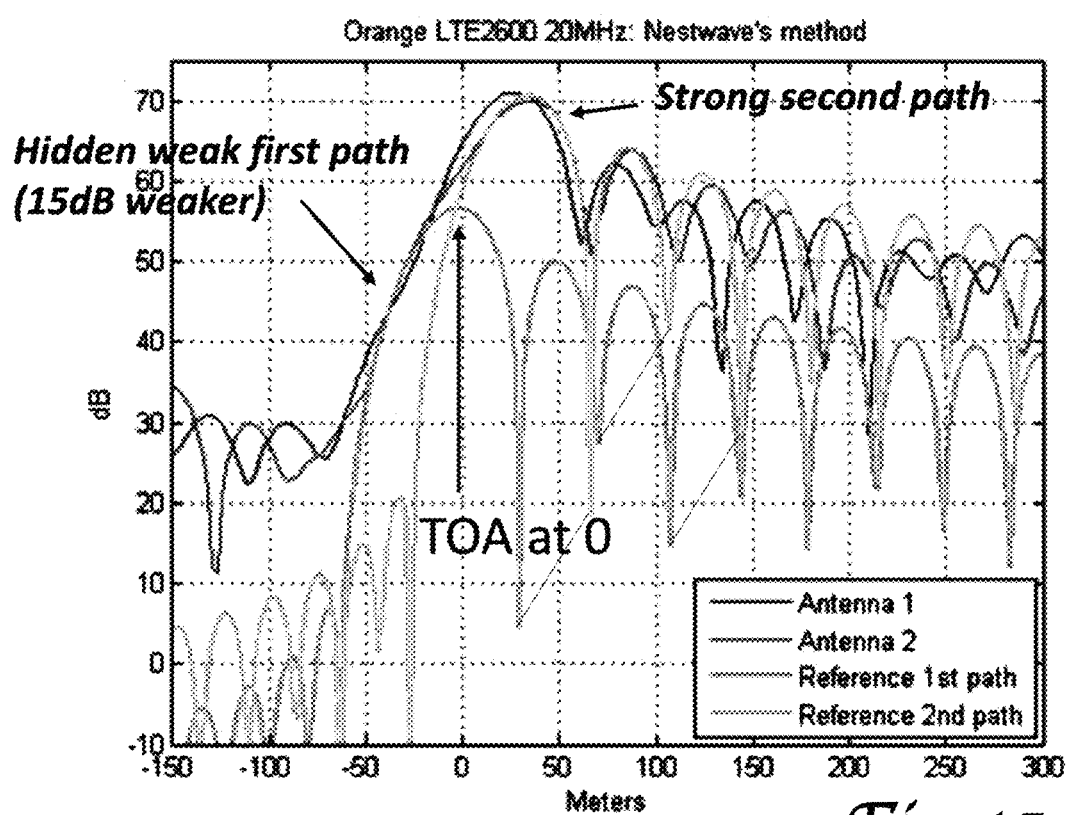

FIGS. 14 and 15 are experimentally obtained power vs distance graphs illustrating the near ML decision method. FIG. 15 is a detail of FIG. 14 with the addition of the first two reference waveforms.

In FIG. 14, the first waveform 310 and the second waveform 312 are waveforms of two received signals filtered via a filter of the present invention. Each received signal was output by the same receiving antenna as a response to two transmitted signals emitted by respective transmitting antennas. The transmitting antennas are located at the same location. The receiving antenna was at a low floor, where the proportional power of the first tap (pulse) and subsequent taps was unknown, since there was no line of sight between the transmitting antennas and the receiving antennas.

In FIG. 15, the graph includes the first reference waveform 314 and the second reference waveform 316 corresponding to first and second paths respectively. The reference waveforms have the same shape which is shifted both along space axis and the power axis to simulate two taps of different powers arriving at different times. The appropriate energies and times for the first and second reference waveforms are easily found since they are near an energy and time of an initial reference waveform estimated according to 2-point or N-point matching decision. When the residual LS error between each waveform 310 and 312 and the reference waveforms 314 and 316 is below a certain threshold or starts to rise, the operating point 318 of each waveforms 310 and 312 is found. If needed, a third waveform can be added.

D. Noise Whitening Via Weighted Least Squares (WLS)

All of the above LS-based decisions formulas can be much improved by using a Weighted LS (WLS) formula in order to whiten the colored noise when oversampling rate is high. The general formula changes to $$\min_{a,t_i}(Y'-\Sigma a_i X'(t_i))^H C^{-1}(Y'-\Sigma a_i X'(t_i))$$

Where C is the noise covariance matrix of the 2 or N point noise vector N' from the general model of signal plus noise:

$$Y'=\Sigma a_i X'_i + N'$$

i.e. N' is the noise left after subtracting all paths i whose impact on the first path we wish to take into account (1 or more paths, including the first path).

E. General Solution for Near-ML with WLS Matching Problem

A general and compact expression of the model and WLS formula is given by $$Y'=XA+N'$$

$$\min_{A,X}(Y' - XA)^H C^{-1}(Y' - XA)$$

where vector A is a vertical concatenation of the complex scalars $a_i$, and the matrix X is a horizontal concatenation of the vectors $X'(t_i)$ (with i=1 . . . M) which includes the first path (i=1) and as many nearby multipath as are desired or needed to consider to reduce their impact on the first path. The solution for vector A is the estimator $$\hat{A}=(X^H C^{-1}X)^{-1}X^H C^{-1}Y'$$

And for $X=(X'(t_1),X'(t_2) \ldots X'(t_M))$, i.e. for $X'(t_i)$, i.e. for $t_i$, we obtain $$\min_X Y'^H(I - X(X^H C^{-1}X)^{-1}X^H C^{-1})^H C^{-1}(I - X(X^H C^{-1}X)^{-1}X^H C^{-1})Y'$$

i.e.

$$\max_X Y'^H C^{-1} X(X^H C^{-1}X)^{-1}X^H C^{-1}Y'$$

which can be expressed as $$\max_M Y'^H M Y'$$

The matrix M of size N by N is given above, and depends on the hypotheses $\hat{t}_i$. For a given hypothesis on the set of $t_i$, matrix M is a constant and can be pre-computed and pre-stored. There does not exist a good solution Â for any number of M included multipath, and any number N of matching points, and any spacing between the points. Usually, M<N, and the spacing between the N points should be sufficiently large to reduce correlation among them.

The above method's implementation can be accelerated in several ways.

F. Efficient Implementation by Pre-Computing Matrix M

A few possible values of matrix M can be precomputed, one value for each set of hypotheses $\hat{t}_i$. For example, for 2 paths (first path and second path), we could have 2×2=4, or 3×3=9 possible values for the hypotheses $\hat{t}_i$ and hence for M. The value that maximizes $$\max_M Y'^H M Y'$$

is selected.

Optionally, afterwards, a gradient descent or any optimization method can be used to fine tune the values of $\hat{t}_i$ around the initial pre-stored value. But this may require re-computing M, or some equivalent method.

III. Parameter Optimization

For all the above methods, thresholds and filter selection can be tweaked per type of channel, e.g. based on delay spread, based on the energy of the first cluster of paths (relative to noise, i.e. SNR of first cluster). It is the first cluster that we wish to analyze and equalize. The first cluster can be defined as the first few samples where energy is detected. The thresholds may be set in two different ways: peak detection threshold (i.e. when a peak is found, useful at low SNR), or energy detection threshold (i.e. when energy rises above the noise, useful at high SNR). In the former case, the TOA can be assumed to occur a few samples earlier than the detected peak. In the latter case, the TOA can be assumed to occur a few samples later than when energy is first detected. Interpolation, extrapolation, curve fitting, etc, can also be used to locate the peak after the energy rise position is detected.

A. Using 2 Thresholds (Based on Peak & Noise Floor)

In some embodiments of the present invention, noise floor can be estimated using a moving average over the time domain channel impulse response. The SNR can be estimated using the maximum and minimum of the moving average filter, and can be used to select the decision method to choose. Alternatively, thresholds based on noise floor, peak power and/or peak average power can be used to tweak the parameters of the decision method.

B. Adapting the Thresholds and the Causal Filter

In some embodiments of the present invention, an initial estimate of the TOA can be made using a causal filter with minimal oversampling (e.g. 1 k FFT for 601 carriers). Subsequently, a higher resolution channel impulse response (CIR) is computed using chirp-z transform (CZT). For this highly oversampled CIR a different frequency windowing filter can be applied, based on the estimated SNR (and channel type). This may be a causal filter or a non-causal with narrower impulse response to aid in peak detection.

C. Waveform Matching

Upon detecting the first cluster, waveform matching can be applied to separate independent taps. Examples of waveform matching were described above in section II.

D. Automation and Optimization

The inventors have observed that the TOA estimation problem can be modeled by a relatively small set of parameters. These parameters include filter design (e.g. the weights), threshold levels, oversampling, interpolation parameters, offset values, window search positions, average SNR, local SNR of first arriving cluster of paths, channel model, etc. These parameters can be optimized using various optimization techniques to achieve best results, in the sense of minimizing a cost function.

In some embodiments, the channel model is used for optimizing the parameters and/or thresholds. The channel model can be a mix of channel models (and a mix of line-of-sight (LOS) and non-line-of-sight (NLOS) cases).

Given a channel type, simulations are run to determine the best parameters for the filter and/or thresholds. Optionally, a first set of parameters and/or thresholds are used as a starting point and simulations are run according to this first set. The simulations are the run again with a second set of parameters and/or thresholds which vary slightly from those of the first set. If results improve, a new set of parameters and/or thresholds is chosen by further changing the parameters and/or thresholds along that gradient of the change of the parameters and/or thresholds from the first set to the second set. If results degrade, the new set of parameters and/or thresholds is chosen by further changing the parameters and/or thresholds along that gradient of the change of the parameters and/or thresholds from the first set to the second set. In some embodiments of the present invention, the optimization further includes restarting from a further set of parameters and/or thresholds and reiterating the above process, until there is a certain confidence that a global minimum has been of the cost function has been found.

The cost function can be based on CDF (Cumulative Distribution Function) of the TOA error metric. The goal can be to minimize the outliers on this curve (e.g. 95th percentile has lowest possible error), or to maximize average performance (e.g. 70th percentile has lowest possible error, or average error is lowest possible for all channel instances).

Figure 18:
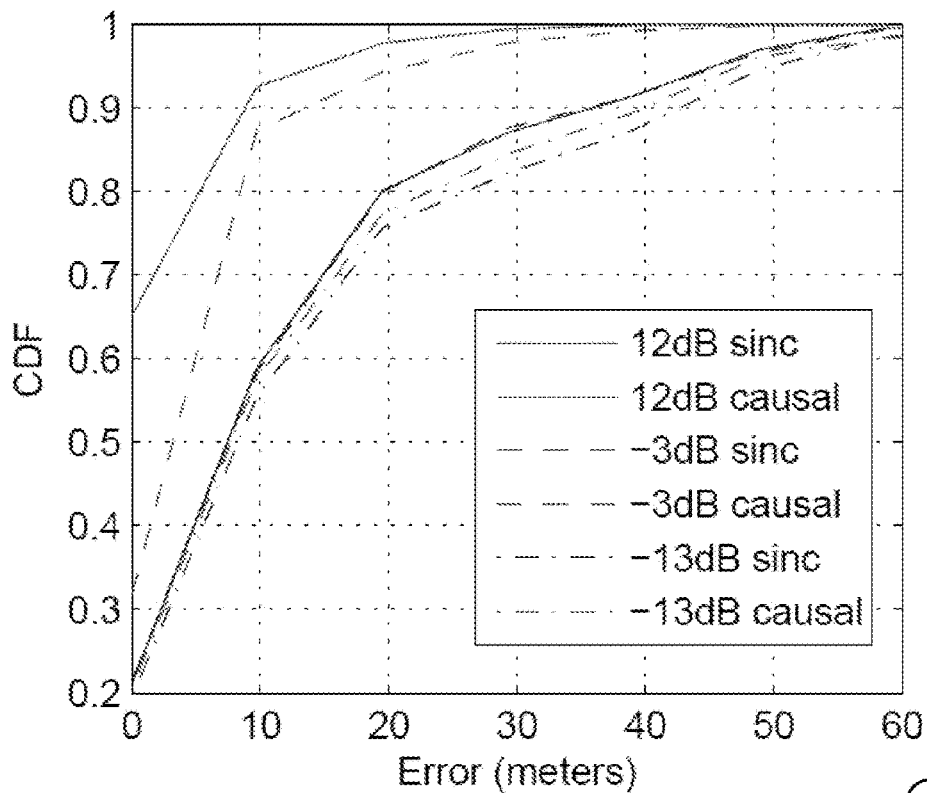
FIGS. 18 and 19 are graphs representing Cumulative Distribution Functions of the TOA estimate errors for signals filtered by causal filters of the present invention and by sinc filters.
Figure 19:
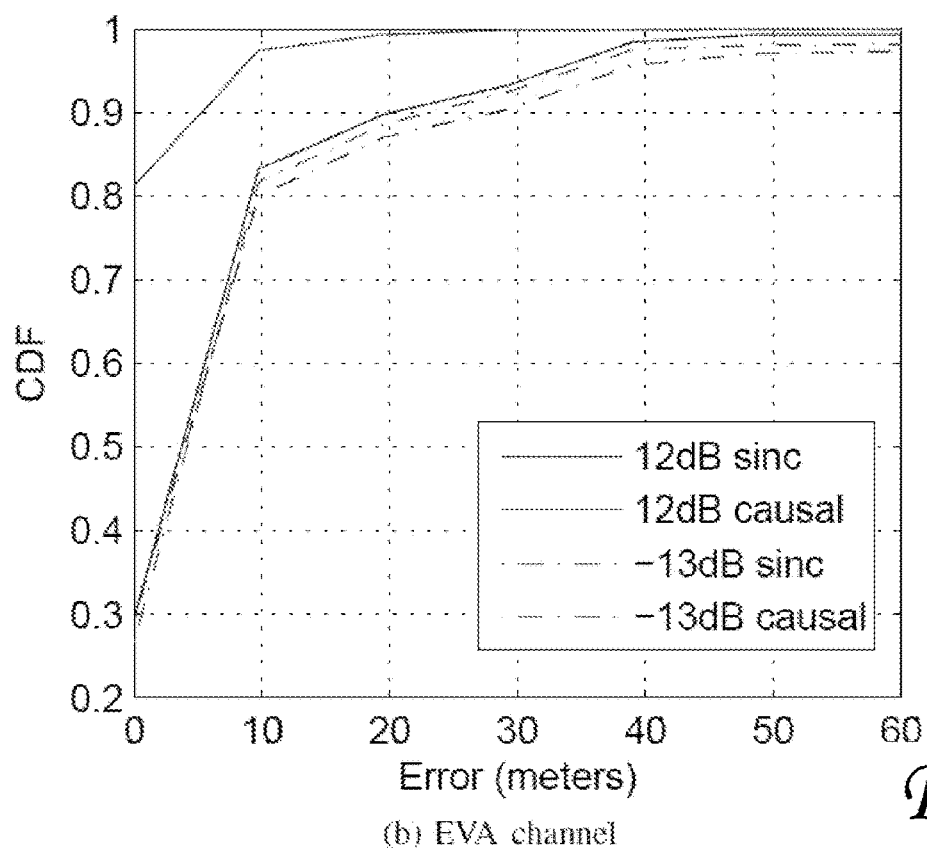

Referring to FIGS. 18 and 19, an LTE signal with 10 MHz bandwidth, SNR of −13 dB, −3 dB and 12 dB, with 1 receiver antenna and 6 coherently combined PRS subframes (Positioning Reference Signals) is considered.

The waveform is sampled at 30.72 Msps. First path detection thresholds are tweaked for the difficult channel ETU (Extended Typical Urban) channel (FIG. 18). The same thresholds are retested unchanged on the channel EVA (Extended Vehicular A) (FIG. 19), although these thresholds can be adapted to each channel type. In both cases 0 Hz Doppler is assumed. Thresholds are tweaked independently for each of sine and near-causal filters, and at each SNR level, such that the error probability is minimized. The near-causal filter used at −3 dB and 12 dB SNR is shown in FIG. 5. The near-causal filter that we used at −13 dB is less stringent (cf. Table II) with reduced loss at the origin. The filters used in FIGS. 18 and 19 were obtained according to the constraints or weights method described above.

Simulation results for TOA estimation using 5000 ETU and 5000 EVA channel instances are given in FIGS. 18 and 19. The cumulative distribution function is plotted as a function of the error in meters. It can be seen that by minimizing error probability, TOA estimation by using the causal or near causal filter of the present invention yield a higher probability of low error in all cases.

F. Adjusting the Channel Model Before Applying Optimization

Parameter optimization can be performed for a given channel model but this can be misleading. Unless large field measurements are made, the typical theoretical channel models have to be adapted to take into account NLOS and other impacts. For example, simply choosing the Extended Pedestria A (EPA) channel model can be problematic, because the parameters for a sinc filter (non-causal) can be optimized to achieve acceptable performance. But such parameters would fail when the first path is weak (NLOS).

Instead, EPA can be adjusted model such that the first path is stronger or weaker by +10 dB, 0 dB, −10 dB and −20 dB (with a given proportion mix of each case) in order to model near LOS and NLOS cases. Thresholds and parameters are the optimized as described in section III(D) above. As seen above in FIGS. 13 and 14, the use of causal filters of the present invention can help estimating TOA in NLOS cases.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

IV. System for Estimating TOA

All the techniques described above regarding filter construction, filter selection, and TOA estimation require a processing system for being executed. Therefore, an aspect of some embodiments of the present invention relates to a system for estimating TOA.

Figure 20:
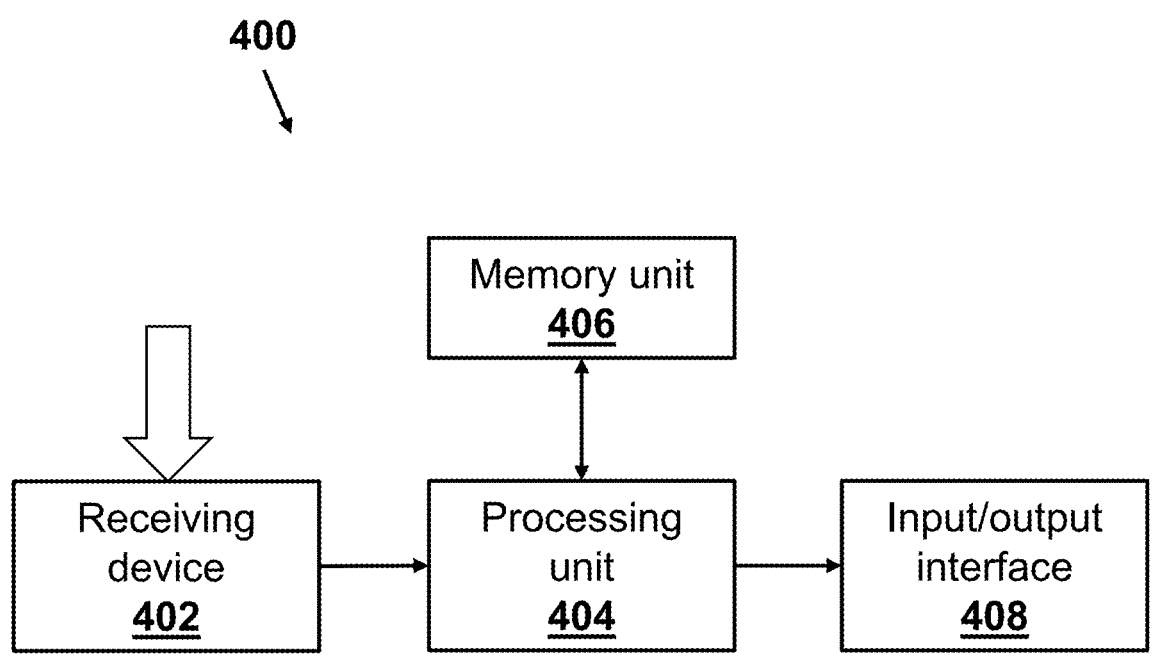
FIG. 20 is a box diagram illustrating a computerized processing system configured for estimating TOA, according to some embodiments of the present invention.

The system 400 for estimating TOA is illustrated in FIG. 20. The system includes a receiving device 402, a processing unit 404, a memory unit 406, and an input/output interface 408.

Generally, the system 400 is used for online TOA estimation, and may not be required to generate a causal filter described above. Instead, the system 400 may analyze a received signal, extracts one or more properties therefrom, and use the one or more properties to match the one or more properties of the received signal to a corresponding pre-calculated filter. In some embodiments of the present invention, a single pre-calculated filter is available for being applied to an incoming signal.

The receiving device 402 may be any kind of detector able to detect the transmitted signal. In the case in which the transmitted signal is a radio signal, the receiving device is any kind of known antenna operating within a radio frequency. The receiving device 402 is configured for generating a received signal in response to the reception of the transmitted signal.

The received signal is received by the processing unit 404, which applies a near-causal filter as described above to the received signal, to generate the first waveform. The processing unit 404 follows the method of FIG. 11 to estimate TOA, by using any one of the above described decision methods. When the TOA estimation is complete, the processing unit 404 may output the estimated TOA value to the input/output interface 408, which will communicate the value to a user, and/or stores the estimated value in the memory unit 406, for later use and/or further processing.

Preferably, prior to the application of the filter, the processing unit 404 extracts at least one value related to at least one property related to at least one of a signal to noise ratio (SNR) of the received signal in the time domain, a channel length, and a power delay profile. In some embodiments of the present invention, the memory unit 406 includes a plurality of pre-calculated instances/adaptations of the near-causal filter, each instance corresponding to a respective value of the one or more properties. The processing unit 404 selects the pre-calculated adaptation of the near-causal filter which corresponds to the extracted value. The pre-calculated filters are configured for filtering the matching received signals in order to enable more accurate and/or easier TOA estimation by the further processing of the filtered received signal (first waveform).

Optionally, following the application of the near causal filter the processing unit is configured for analyzing the first waveform, in order to check if a better instance of the near causal filter can be applied to the received signal. In this manner, the near causal filter can be optimized to the received signal.

The memory unit 406 is a non-volatile type of computer memory in communication with the processing unit and is configured for storing data indicative of: the non-causal filter or of a plurality of adaptations thereof, computer-readable instructions for processing the received signal, computer-readable instructions for processing the received signal for executing the at least one predefined decision technique.

The input/output interface 408 is any type of interface that connects the processing unit to input and or output devices, to enable communication between the processing unit and a user.

The processing unit comprises a microprocessor, microcontroller, custom ASIC, and/or discreet circuitry selected on the basis of power consumption, size, processing speed, memory capacity, and other factors for performing all of the functionality of the apparatus.

The system 400 may include a cellular phone, a smart phone, a tablet computer, a laptop computer, a desktop computer, or any similar computing/communication electronic device.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for estimating a time of arrival of a signal, the signal being generated by a transmitting device as a transmitted pulse, transmitted over a channel, and received by a receiving device as a received signal, the received signal being filtered via a filter, to generate a first waveform,
   wherein the filter is constructed based on an expected power delay profile of the channel such that paths of the first waveform other than a first path of the first waveform are treated as colored noise;
   the method comprising:
   moving the first waveform to a time domain if the first waveform is in a frequency domain;
   identifying a first operating point on the first waveform in the time domain;
   identifying a location of a first pulse within the first waveform in the time domain, according to a predefined decision technique;
   determining a property comprising at least one of: a signal to noise ratio (SNR) of the first waveform in the time domain, a channel length, and a power delay profile;

selecting one of a plurality of predetermined filters matching the property, the predetermined filters being pre-calculated for enabling better estimation of the time of arrival when applied to signals having corresponding properties; and applying the selected filter to the received signal.

2. The method of claim 1 wherein the operating point is based in part on a tradeoff between maximizing signal height above noise and maximizing a time before subsequent multipath.

3. The method of claim 1 wherein the power delay profile of the channel is a power delay profile of a cellular type channel.

4. The method of claim 1 wherein the filter is constructed based on an expected power delay profile of the channel such that paths of the first waveform other than a first path of the first waveform are treated as colored noise in time domain.

5. The method of claim 1 wherein the filter is constructed $X=(V+\Gamma W \Gamma^H)^{-1} G$, where V is a noise covariance matrix, G is a vector representative of the transmitted waveform, $\Gamma$ is a diagonal matrix of G in frequency domain, and W is a diagonal matrix in time domain corresponding to the expected power levels of signal paths of the channel.

6. The method of claim 1, wherein the first operating point is a point above an energy rise point by a pre-determined threshold.

7. The method of claim 1, wherein the predefined decision technique comprises:

applying the filter to a reference signal to generate a reference waveform, wherein the reference signal is used by the transmitting device to generate the transmitted pulse;

choosing points in an operating segment of the first waveform above a predetermined energy level with respect to the estimated noise level;

calculating a best match between the points and one or more segments of the reference waveform;

determining a time offset for the first pulse based on the position of the segment of the reference waveform having the best match.

8. The method of claim 7, wherein the best match is one of:

a) a point at which a minimal least squares error between a shape of the first waveform and a shape of a corresponding section of the reference waveform is found;

b) a point at which a least squares error between the shape of the first waveform and a shape of a corresponding section of the reference waveform is below a first predetermined threshold and an energy of the point is above a second pre-determined threshold with respect to the estimated noise;

c) a point at which a minimal weighted least squares error between a shape of the first waveform and a shape of a corresponding section of the reference waveform is found, the minimal weighted least squares error being expressed as $$\min_{a,t_1}(Y' - a_1 X'(t_1))^H C^{-1}(Y' - a_1 X'(t_1))$$

$$Y' = a_1 X_1' + N'$$

where Y' and X'($t_1$) are the complex vectors containing the 2 or N consecutive points, respectively taken from the first waveform and from the reference waveform, $a_1$ is a complex scalar and $t_1$ is a time shift of the reference waveform, X'$_1$ is a complex vector corresponding to a waveform of first pulse to be received, C is the noise covariance matrix of the 2 or N point noise vector N' from the general model of signal plus noise and N' is the noise left after subtracting a waveform of the first arriving pulse (first path) from Y'; or d) a point at which a weighted least squares error is below a predetermined error between the shape of the first waveform and a shape of a corresponding section of the reference waveform and an energy of the point is above a second pre-determined threshold with respect to the estimated noise.

9. The method of claim 1, further comprising applying the filter to the received signal in time domain, in conjunction with a low pass filter.

10. The method of claim 9, further comprising, following the application of the filter, at least one of: down-sampling, pilot descrambling, accumulation, and integration of the first waveform.

11. The method of claim 9, comprising constructing the near causal filter prior to applying the filter.

12. A method for estimating a time of arrival of a signal, the signal being generated by a transmitting device as a transmitted pulse, transmitted over a channel, and received by a receiving device as a received signal, the received signal being filtered via a filter, to generate a first waveform, wherein the filter is constructed based on an expected power delay profile of the channel such that paths of the first waveform other than a first path of the first waveform are treated as colored noise; wherein the filter is constructed $X=(V+\Gamma W \Gamma^H)^{-1} G$, where V is a noise covariance matrix, G is a vector representative of the transmitted waveform, F is a diagonal matrix of G in frequency domain, and W is a diagonal matrix in time domain corresponding to the expected power levels of signal paths of the channel;

the method comprising:

moving the first waveform to a time domain if the first waveform is in a frequency domain;

identifying a first operating point on the first waveform in the time domain; and identifying a location of a first pulse within the first waveform in the time domain, according to a predefined decision technique.

13. A method for estimating a time of arrival of a signal, the signal being generated by a transmitting device as a transmitted pulse, transmitted over a channel, and received by a receiving device as a received signal, the received signal being filtered via a filter, to generate a first waveform, wherein the filter is constructed based on an expected power delay profile of the channel such that paths of the first waveform other than a first path of the first waveform are treated as colored noise;

the method comprising:

moving the first waveform to a time domain if the first waveform is in a frequency domain;

identifying a first operating point on the first waveform in the time domain; and identifying a location of a first pulse within the first waveform in the time domain, according to a predefined decision technique; wherein the predefined decision technique comprises:

applying the filter to a reference signal to generate a reference waveform, wherein the reference signal is used by the transmitting device to generate the transmitted pulse;

choosing points in an operating segment of the first waveform above a predetermined energy level with respect to the estimated noise level;

calculating a best match between the points and one or more segments of the reference waveform;

determining a time offset for the first pulse based on the position of the segment of the reference waveform having the best match.

* * * * *